(12) United States Patent
Thomas et al.

(10) Patent No.: US 9,449,173 B2
(45) Date of Patent: Sep. 20, 2016

(54) TECHNIQUES FOR ENABLING CO-EXISTENCE OF MULTIPLE SECURITY MEASURES

(71) Applicant: INTEL CORPORATION, Santa Clara, CA (US)

(72) Inventors: Ramesh Thomas, Saratoga, CA (US); Manohar R. Castelino, Sunnyvale, CA (US); Kuo-Lang Tseng, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/494,260

(22) Filed: Sep. 23, 2014

(65) Prior Publication Data
US 2016/0085967 A1    Mar. 24, 2016

(51) Int. Cl.
*G06F 21/56* (2013.01)
*G06F 12/14* (2006.01)
*G06F 21/64* (2013.01)
*G06F 21/62* (2013.01)

(52) U.S. Cl.
CPC ........... *G06F 21/56* (2013.01); *G06F 12/1408* (2013.01); *G06F 21/6218* (2013.01); *G06F 21/64* (2013.01); *G06F 2212/1052* (2013.01); *G06F 2221/034* (2013.01); *G06F 2221/2107* (2013.01)

(58) Field of Classification Search
None
See application file for complete search history.

(56) References Cited

U.S. PATENT DOCUMENTS

| 2003/0018892 A1* | 1/2003 | Tello .............................. 713/164 |
| 2012/0054868 A1* | 3/2012 | Ramalingam ................... 726/24 |
| 2013/0167222 A1* | 6/2013 | Lewis ............................. 726/17 |

* cited by examiner

*Primary Examiner* — Benjamin Lanier

(57) ABSTRACT

Various embodiments are directed enabling anti-malware software to co-exist with protective features of an operating system. An apparatus may include a processor component including an IDT register storing an indication of size of an IDT; a monitoring component to retrieve the indication and compare the indication to a size of a guard IDT in response to modification of the IDT register to determine whether the guard routine is to inspect the IDT and a set of ISRs; and a cache component to overwrite the IDT and set of ISRs with a cached IDT and cached set of ISRs, respectively, based on the determination and prior to the inspection to prevent the guard routine from detecting a modification by an anti-malware routine, the cached IDT and cached set of ISRs generated from the IDT and set of ISRs, respectively, prior to the modification. Other embodiments are described and claimed.

24 Claims, 12 Drawing Sheets

TECHNIQUES FOR ENABLING CO-EXISTENCE OF MULTIPLE SECURITY MEASURES

BACKGROUND

It has become commonplace to use anti-malware routines to protect computing devices from unauthorized accesses, takeovers, theft of information and other malicious operations performed by malicious software (malware) such as computer "viruses" or "worms." In recent years, malware has become so pervasive that purveyors of operating systems have, of necessity, started to incorporate various protection measures into those operating systems. Unfortunately, while building in such protections into an operating system may provide many desirable benefits by effectively "hardening" an operating system against attack, such an approach can also have the effect of making the use of additional security measures with those operating systems more difficult.

Specifically, anti-malware features built into operating systems tend to restrict access to components of those operating systems that ironically need to be accessible to anti-malware software that may be installed alongside those operating system to protect those components and/or other components of those operating systems. By way of example, anti-malware software (e.g., also commonly referred to as "anti-virus" or "intrusion protection" software) often requires access to components of an operating system that respond to or control responses to hardware and/or software interrupts employed in context switching, responding to various events that may arise during the performance of various functions. Interrupt handling is a core function of many operating systems, and both the kernel components and kernel data structures that implement and support interrupt handling may be used as a "choke point" in a flow of execution of instructions either to perform malicious operations or to detect and prevent them.

DETAILED DESCRIPTION

Figure 1:
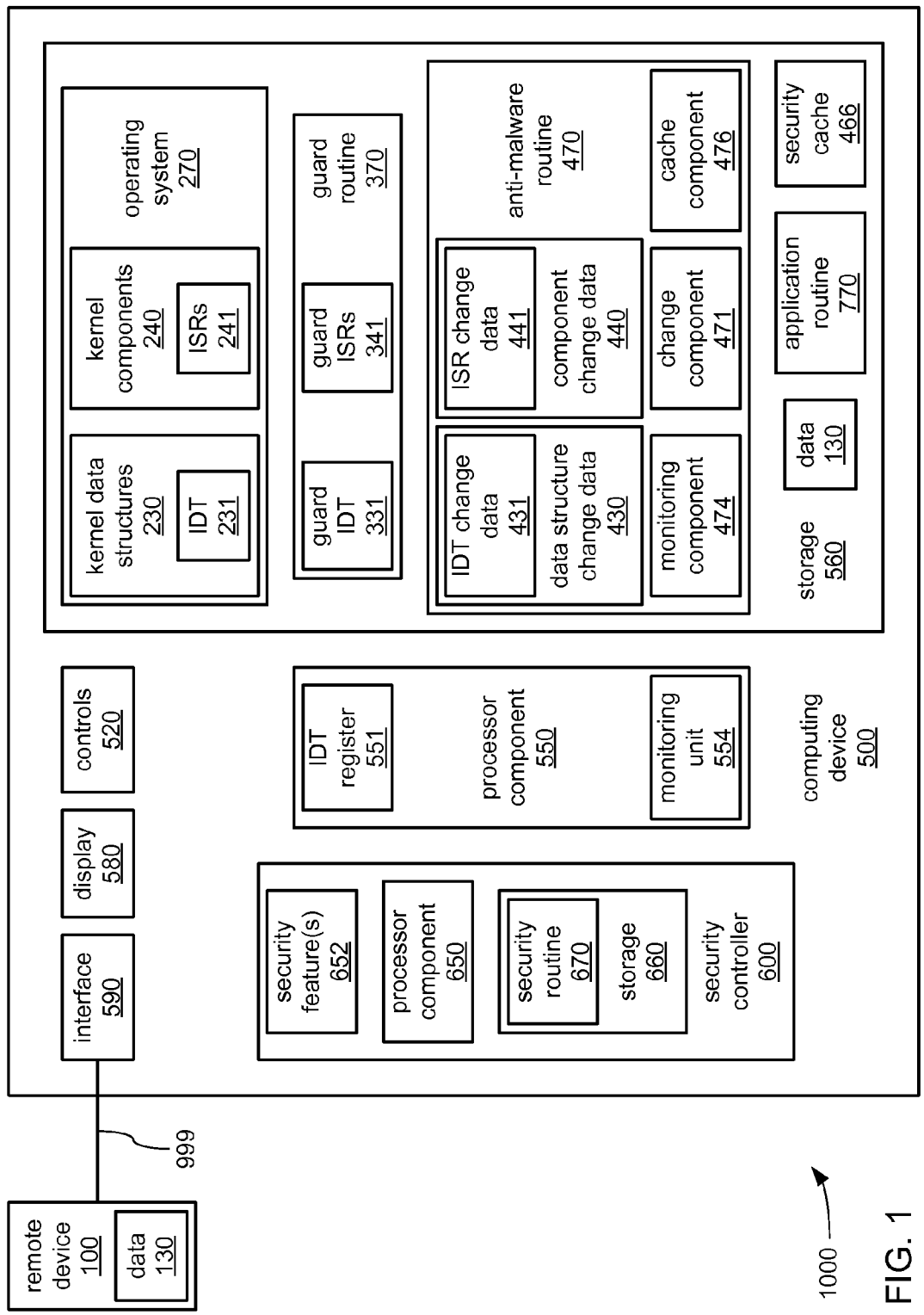
FIG. 1 illustrates an example embodiment of a secured processing system.

Various embodiments are generally directed to techniques for enabling anti-malware software to co-exist with protective features incorporated into an operating system of a computing device. A guard routine of the operating system may recurringly perform an inspection of various kernel components of the operating system, including an interrupt descriptor table (IDT) and/or a set of interrupt service routines (ISRs), to detect unauthorized changes thereto. Unfortunately, changes made by an anti-malware routine that co-exists with the operating system may be determined by the guard routine to be unauthorized changes. To prevent this response, the anti-malware routine detects the start of such an inspection by the guard routine and responds by undoing a multitude of changes earlier made by the anti-malware routine to at least one or both of the IDT and the ISRs ahead of the inspection by the guard routine to prevent the guard routine from detecting those earlier made changes. The anti-malware routine subsequently detects the end of the inspection and responds by putting those changes to at least one or both of the IDT and the ISRs back in place.

A guard routine of an operating system may make use of a virtual machine component to recurringly stop execution of most other routines by a processor component of a computing device to enable the guard routine to have relatively uninterrupted access to various kernel components and/or data structures of the operating system for a brief period of time. During that brief period, the guard routine may inspect those kernel components and/or kernel data structures for indications of unauthorized changes. Among those kernel components may be a set of ISRs that include executable instructions to respond to interrupts and among those kernel data structures may be an IDT that includes pointers to the start of executable instructions for individual ones of the ISRs. For some kernel components and/or data structures, it may be that no changes are authorized such that the guard routine attempts to confirm that those kernel components and/or kernel data structures are completely unchanged from an original state. For other kernel components and/or data structures, it may be that some limited changes that may include changes made by other kernel components may be authorized. By way of example, some limited degree of change to the IDT and/or the set of ISRs (e.g., changes to particular entries in the IDT and/or particular ones of the ISRs) may be authorized and/or expected to occur such that the guard routine may not determine those changes to be unauthorized. However, other changes made to the IDT and/or the set of ISRs (e.g., any change to other particular entries in the IDT and/or other particular ones of the ISRs) may be determined by the guard routine to be unauthorized by the guard routine.

As part of detecting and stopping malicious activity by malware, an anti-malware routine may modify various kernel components and/or data structures to cause the anti-malware routine to at least be provided with an indication of whenever specific actions that may be those of malware are taking place or are about to take place. By way of example, the anti-malware routine may modify one or more of the ISRs to insert executable instructions to notify the anti-malware routine when particular ones of the ISRs are called and/or to cause a flow execution of instructions to jump away from one or more the ISRs to the anti-malware routine to enable the anti-malware routine to determine whether execution of those ISRs should be allowed to proceed. Alternatively or additionally, the anti-malware routine may modify one or more of the ISRs by replacing them through changing pointers within the IDT. The IDT may include a set of pointers that each point to an address at which the first executable instruction of an ISR is located in a storage of the computing device. Instead of modifying the executable instructions of an ISR, the anti-malware routine may alter the pointer within the IDT associated with that ISR to point to the first executable instruction of an alternate version of that ISR that includes the changes that the anti-malware routine might otherwise have made directly to the executable instructions of that ISR.

In some embodiments, one or more components of the computing device may incorporate various security features that may be deemed desirable to use in cooperation with the anti-malware routine, or that may require the support of the anti-malware routine to be used by other software. By way of example, a processor component and/or other circuitry of the computing device (e.g., circuitry of a support chipset) may incorporate an encryption engine, a secure storage in which security credentials may be stored, a secure data pathway between two or more components, logic to generate and/or verify security credentials, etc. The operating system may not have originally been created to make use of at least particular implementations of such security features and/or those security features may otherwise be intended to be accessible only under control of the anti-malware routine. To enable use of such security features, the anti-malware routine may modify one or more of the ISRs as previously described. Alternatively or additionally, the anti-malware routine may modify the set of ISRs to add one or more ISRs to enable use of such security features. Correspondingly, the anti-malware routine may modify the IDT to add one or more pointers corresponding to the one or more added ISRs.

In some embodiments, a processor component of the computing device may incorporate an IDT register (IDTR) to maintain at least a pointer to the location in the storage of the IDT. The IDT register may also maintain an indication of the quantity of the size of the IDT. Such a size value may either indicate the current size of the IDT or an upper limit on the size of the IDT. Such a size value within the IDT register may specify the size of the IDT in terms of a quantity of bits, bytes, words, doublewords, quadwords, etc., or in terms of a quantity of entries within the IDT, each of which may include a pointer to one of the ISRs. In such embodiments, and where the anti-malware routine modifies the IDT to add one or more of such entries that correspond to one or more ISRs added to the set of ISRs by the anti-malware routine, the anti-malware routine may modify the indication of size of the IDT maintained within the IDTR to reflect the increase in size of the IDT as a result of the added one or more entries.

As part of preparing to inspect kernel components and/or data structures, the guard routine may alter the contents of the IDTR to point to a guard IDT that, in turn, contains pointers to a set of guard ISRs under the control of the guard routine. The guard routine and/or other component(s) of the operating system may provide a greater degree of protection to the guard IDT and/or set of guard ISRs, including not permitting any modification of either, including by other components of the operating system. Modifying the IDTR to point to the guard IDT, and therethrough, to the set of guard ISRs may be part of a mechanism employed by the guard routine to prevent at least some other routines from taking control of the computing device away from the guard routine in a manner that may thwart the inspections that the guard routine performs. More specifically, attempts to call an ISR while the other IDT and other set of ISRs are in place through modification of the IDTR may ultimately result in a call back to a portion of the guard routine, instead of to another routine as part of an attempt to circumvent the guard routine. Alternatively or additionally, the guard routine may cooperate with a component of the operating system (or other routine that accompanies the operating system) implementing virtual machine (VM) support to at least momentarily prevent software executed within one or more other VMs from executing, while allowing a VM in which at least the guard routine is executed to continue executing.

The anti-malware routine may receive indications of attempts to modify the IDTR and/or modifications that have been made to the IDTR. The anti-malware routine may respond to those indications by retrieving and analyzing information concerning those modifications to determine if the modifications are by the guard routine in preparation for inspecting kernel components and/or data structures. Upon determining that the guard routine is about to perform such an inspection, the anti-malware routine may undo modifications that it has made to one or more kernel components or data structures, including one or both of the IDT and the set of ISRs, the inspection begins. More precisely, the anti-malware routine may return the IDT and/or the set of ISRs to the state they were in before the anti-malware routine made changes to one or both of them. Alternatively, where one or more kernel components have attempted to modify the IDT and/or the set of ISRs since the last time the guard routine inspected one or both of them, the anti-malware routine may place the IDT and/or the set of ISRs into a state consistent with the changes by the one or more kernel components having been made, but not including the changes made by the anti-malware routine.

Following the inspection of at least the IDT and/or the set of ISRs by the guard routine, the guard routine may again alter the contents of the IDTR to once again point to the IDT, instead of pointing to the guard IDT. Again, the anti-malware routine may receive indications of such altering of the IDTR, and may retrieve and analyze information concerning such modifications to the IDTR to determine if the modifications are by the guard routine in concluding an inspection. Upon determining that the guard routine has concluded an inspection from that analysis, the anti-malware routine may reinstate its modifications to various kernel components and/or data structures, including the IDT and/or the set of ISRs.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a secured processing system 1000 incorporating one or more of a remote device 100 and a computing device 500. The computing device 500 and the remote device 100 may exchange data 130 that may be stored by one and/or the other, and which it may be deemed desirable to keep secure. An anti-malware routine 470 may cooperate with at least an operating system 270 of the computing device 500 to provide security in various ways, including and not limited to controlling access to the remote device 100, in controlling access to the data 130 received therefrom, in encrypting the data 130 for transmission or storage, in employing security credentials to perform authentication with the remote device 100, etc.

At least as part of initializing the computing device 500, the operating system 270 may generate an interrupt description table (IDT) 231 and a corresponding set of interrupt service routines (ISRs) 241 that are pointed to by pointers maintained within entries within the IDT 231. The operating system 270 may also modify the contents of an IDT register (IDTR) 551 of a processor component 550 of the computing device 500 to point to the IDT 231. As part of monitoring for malicious activities by malware that may become installed and/or active within the computing device 500, and/or as part of enabling one or more security features of the computing device 500, the anti-malware routine 470 may modify the IDT 231 and/or the set of ISRs 241.

On a recurring basis a guard routine 370 associated with the operating system 270 may inspect various kernel components and/or data structures of the operating system 270, including one or both of the IDT 231 and the set of ISRs 241. In so doing, the guard routine 370 may modify the contents of the IDT register 551 to point to a guard IDT 331, which may include pointers that point to ISRs of a set of guard ISRs 341. In response to an indication that the IDT register 551 has been modified, and in response to determining that the modification is in preparation for such an inspection, the anti-malware routine 470 may undo its modifications to the IDT 231 and/or the set of ISRs 241 prior to their inspection by the guard routine 370. Upon concluding such an inspection, the guard routine 370 may modify the contents of the IDT register 551 to again point to the IDT 231. In response to an indication that the IDT register 551 has been modified, and in response to determining that the modification is associated with concluding such an inspection, the anti-malware routine 470 may reinstate its modifications to the IDT 231 and/or the set of ISRs 241.

As depicted, these computing devices 100 and 500 exchange signals conveying data (e.g., the data 130) through a network 999, and may employ one or more security features of the computing device 500 in so doing. However, one or more of these computing devices may exchange other data entirely unrelated to data that is deemed desirable to keep secure with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In alternate embodiments, the remote device 100 and the computing device 500 may be coupled to the computing device 500 in an entirely different manner. In still other embodiments, one or more of the data 130 may be conveyed among these computing devices via removable media (e.g., a FLASH memory card, optical disk, magnetic disk, etc.).

In various embodiments, the computing device 500 may incorporate one or more of the processor component 550, a storage 560, controls 520, a display 580, a security controller 600 and an interface 590 to couple the computing device 500 to the network 999. The processor component 550 may incorporate one or more of the IDT register 551 and a monitoring unit 554. The monitoring unit 554 may monitor at least the IDT register 551 for changes in the contents thereof, and may be configurable to provide indications of such changes. The storage 560 stores one or more of the data 130, the operating system 270, the guard routine 370, the anti-malware routine 470, a security cache 466 and an application routine 770. The controller 600 incorporates one or more of a processor component 650, one or more security features 652 and a storage 660. The storage 660 stores a security routine 670.

The one or more security features 652 may include any of a variety of mechanisms to control access to the computing device 500, to monitor the contents of what is sent or received via the interface or by other mechanisms of exchanging data for malware, may encrypt data (e.g., the data 130) for storage within the storage 560, may provide a secure pathway for multimedia data received from the network 999 to be routed to the display 580 for presentation without being intercepted, etc. More specifically, the security features 652 may include hardware logic to enhance encryption/decryption, to generate and/or match keys and/or signatures, to generate and/or use hashes, etc. The security controller 600 may be incorporated into a support chipset of the computing device 500 that provides support for the operation of the processor component 550, such as providing an interface for the processor component 550 to the storage 560, providing a coupling to one or more busses within the computing device 500 and/or extending externally of the computing device 500, providing one or more timing clocks, etc.

The security routine 640 incorporates a sequence of instructions operative on the processor component 650 in its role as a controller processor component of an operating environment of the security controller 600 that may isolated from the operating environment of the processor component 550 of the computing device 500. By way of example, the storage 660 may be isolated from access by the processor component 550 such that security credentials (e.g., keys, hashes, digital signatures, etc.) may be securely stored therein without the concern that malware executing within the environment of the processor component 550 will be able to cause the processor component to access them. Operating within such an isolated environment, the processor component 650 may retrieve from the storage 660 and execute instructions of the security routine 670 to perform various operations either in support of the security feature(s) 652 or as part of implementing the security feature(s) 652.

Figure 2:
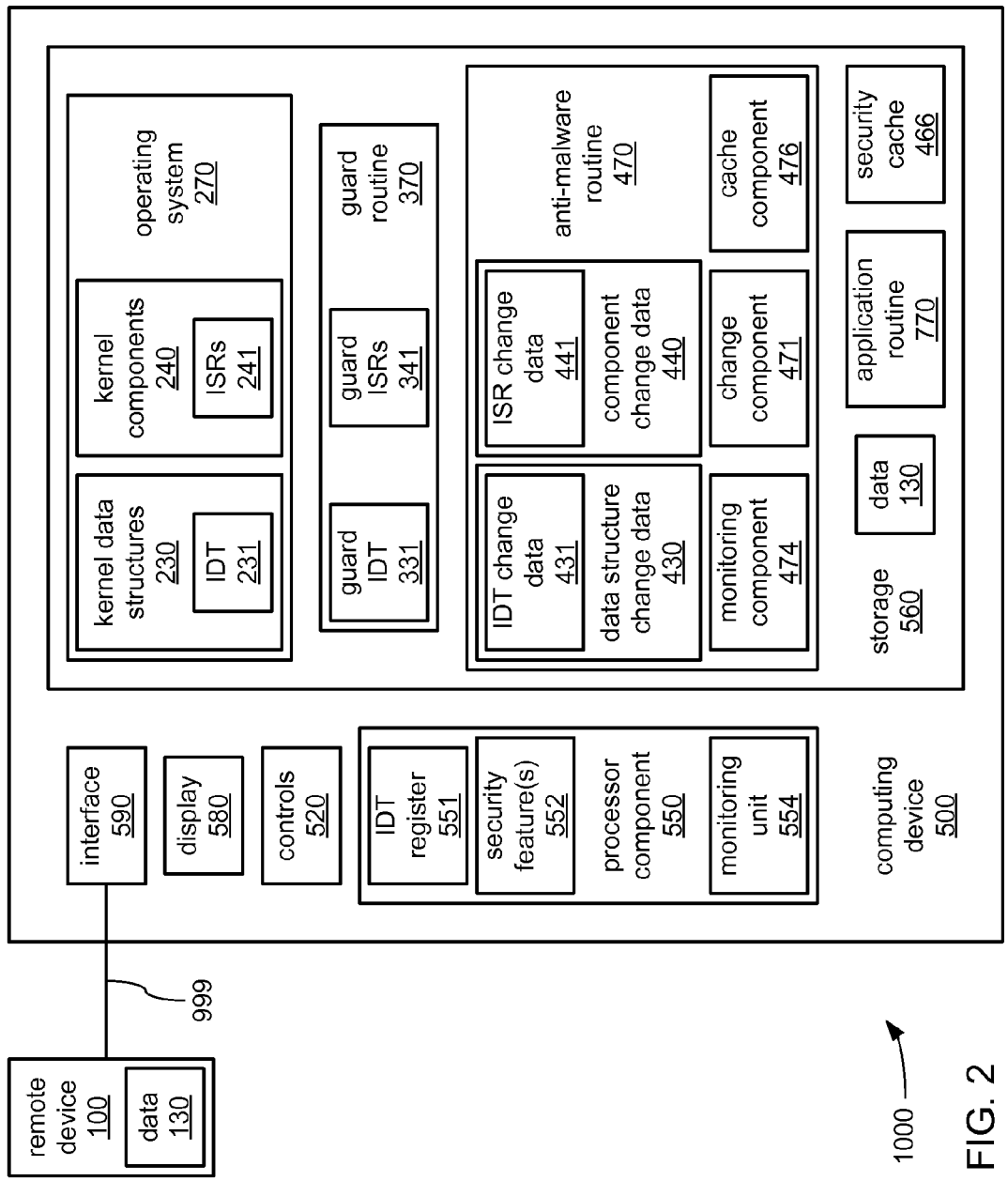
FIG. 2 illustrates an alternate example embodiment of a secured processing system.

However, as depicted in FIG. 2, in alternate embodiments, the computing device 500 may not incorporate such a security controller, and instead, the processor component 550 itself may incorporate one or more security feature(s) 552. In such alternate embodiments, the security features(s) 552 may include a processing circuit to perform encryption, decryption, a hash, etc., to augment other processing performed by the processing component 550. As will be explained in greater detail, in embodiments of both FIGS. 1 and 2, the anti-malware routine 470 may modify at least the IDT 231 and/or the set of ISRs 241 to enable use of the security feature(s) 552 and/or 652 by one or more of the operating system 270, the anti-malware routine 470 and the application routine 770.

Returning to FIG. 1, one or more of the operating system 270, the guard routine 370, the anti-malware routine 470 and the application routine 770 may incorporate instructions operative on the processor component 550 in its role as a main processor component of the computing device 500 to implement logic to perform various functions. As depicted, the operating system 270 may incorporate one or both of kernel components 240 that may include sequences of executable instructions that may be executed as the operating system 270 is executed, and kernel data structures 230 that may include various pieces of configuration information to control execution of the operating system 270, including its kernel components 240. The kernel components may include the set of ISRs 241 and the kernel data structures may include the IDT 231. As also depicted, the guard routine 370 may incorporate one or both of the set of guard ISRs 341 that may each include a sequence of executable instructions that may be executed as the guard routine 370 is executed, and the guard IDT 331. As further depicted, the anti-malware routine may incorporate one or more of data structure change data 430, component change data 440, a change component 471, a monitoring component 474 and a cache component 476. The component change data 440 may include ISR change data 441 made up of indications of changes to be made to the set of ISRs 241 by the anti-malware routine 470. Correspondingly, the data structure change data 430 may include IDT change data 431 made up of indications of changes to be made to the IDT 231 by the anti-malware routine 470. At least the components 471, 474 and 476 may each incorporate a sequence of executable instructions that may be executed as the anti-malware routine 470 is executed. In various embodiments, the operating system 270 may be one numerous versions of the Windows™ operating system offered by Microsoft® Corporation of Redmond, Wash., and the guard routine 370 may be a routine found in some versions of the Windows™ operating system that is sometimes referred to as the "patchguard" routine.

Figure 3:
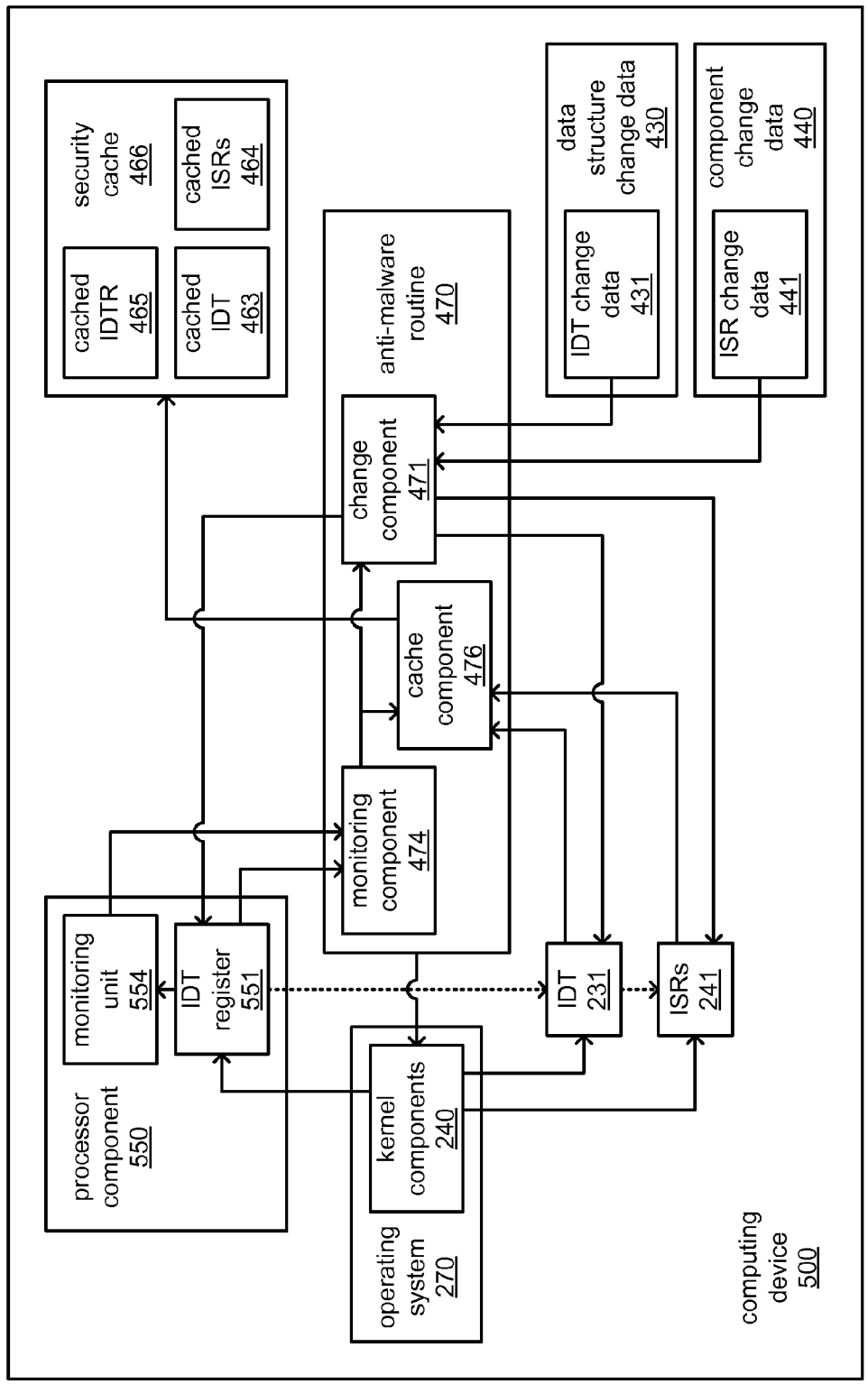
FIG. 3 illustrates an example of generating an IDT and a set of ISRs according to an embodiment.

FIG. 3 depicts an example embodiment of generation and preparation of the IDT 231 and the set of ISRs 241 for use in a manner that includes monitoring by the anti-malware routine 470. In executing one or more of the kernel components 240 of the operating system 270, at least during initialization of the computing device 500 and/or the processor component 550 after a resetting or a powering on of the computing device 500, the processor component 550 may generate one or both of the IDT 231 and the set of ISRs 241. The processor component 550 may also load the IDT register 551 with a pointer that points to an address location within the storage 560 at which the IDT 231 may be stored, and/or an indication of the size of the IDT 231. In some embodiments, such loading of the IDT register 551 may entail the use of a "load IDT" (LIDT) instruction that may be executable by the processor component 550. Such an instruction may load both the pointer to the IDT 231 and the indication of size of the IDT 231 together, or may be capable of loading each separately, into the IDT register 551.

The value in the IDT register 551 that indicates the size of the IDT 231 may specify the size as a quantity of bits, bytes, words, doublewords, quadwords, etc. Alternatively, the size of the IDT 231 may be specified as a quantity of entries, each of which may include a pointer to a separate ISR of the set of ISRs 241. Again, regardless of the manner in which the size value specifies a size, that specified size may be the current size of the IDT 231 or may be an upper limit on the size of the IDT 231. Indeed, during normal operation of the computing device 500 in which the operating system 270 and/or the application routine 770 is executed, and the guard routine 370 is not executed to perform an inspection, the IDT register 551 may be expected to store an expected size value that specifies an upper limit on the size of the IDT 231. The loading and maintaining of such an upper limit may be deemed a desirable approach to enabling a selected degree of modification of the IDT 231 that may commonly be required for execution of the operating system 270 and/or the application 770 within the computing device 500. As familiar to those skilled in the art, the loading of a size value representing a maximum size within the IDT register 551 may also be indicative of an upper limit on the amount of contiguous storage space within the storage 560 that may be pre-allocated for the IDT 231. The monitoring unit 554 of the processor component 550 may monitor various other portions of the processor component 550 for the occurrence of various events that may include instances of loading values into the IDT register 551.

In executing the anti-malware routine 470, the processor component 550 may provide the monitoring component 474 with an indication from the monitoring unit 554 that at least a pointer value has been loaded into the IDT register 551. In response, the monitoring component 474 may retrieve at least that pointer value and provide it to the cache component 476 to use in accessing the IDT 231 and the set of ISRs 241, making copies of both, and storing those copies within the storage 560 as a cached IDT 463 and a cached set of ISRs 464, respectively, of the security cache 466. Again, the IDT 231 includes pointers to the locations of the first executable instruction of each ISR of the set of ISRs 241, thereby enabling the cache component to retrieve a copy of each of those ISRs for storage as part of the cached set of ISRs 464. The cache component 476 may also store a copy of that pointer value as a cached IDTR 465 of the security cache 466. In some embodiments, such retrieval of at least the pointer value from the IDT register 551 may entail the use of a "save IDT" (SIDT) instruction that may be executable by the processor component 550. Such an instruction may save both the pointer value and a value indicating the size of the IDT 231 to a location within the storage 560 specified in that instruction (e.g., the location at which the cached IDTR 465 is stored in the storage 566).

The monitoring component 474 may also provide at least the pointer value retrieved from the IDT register 551 to the change component 471 to use in accessing the IDT 231 and/or the set of ISRs 241 to make modifications thereto. Again, the IDT 231 includes pointers to the locations of the first executable instruction of each ISR of the set of ISRs 241, thereby enabling the change component to access each of the ISRs of the set of ISRs 241 that the change component 471 is to modify. In so doing, the change component 471 may retrieve indications of the modifications to make to the IDT 231 from the IDT change data 431 of the data structure change data 430 stored within the storage 560. Correspondingly, the change component 471 may also retrieve indications of modifications to make to the set of ISRs 241 from the ISR change data 441 of the component change data 440 stored within the storage 560.

As has been discussed, among the changes that may be made to the set of ISRs 241 may be modifications to the set of ISRs 241 to add one or more additional ISRs to provide support for the use of security features of the computing device 500, such as the security feature(s) 652 that may be incorporated into the security controller 600 depicted in FIG. 1 and/or the security feature(s) 552 that may be incorporated the processor component 550 as depicted in FIG. 2. Corresponding to such changes in the set of ISRs 241 may also be modifications to the IDT 231 to add one or more additional entries to add pointers to the one or more additional ISRs.

As the cache component 476 copies the IDT 231 and/or the set of ISRs 241, and/or as the change component 471 modifies the IDT 231 and/or the set of ISRs 241, the anti-malware routine 470 may cooperate with a kernel component 240 or another routine otherwise associated with the operating system to prevent or delay execution of one or more other routines (e.g., the application routine 770) to avoid the possibility of at least some interrupt calls being made. For example, the anti-malware routine 470 may cooperate with a component or other routine associated with the operating system 270 that implements virtual machine (VM) support to at least momentarily prevent software executed within one or more VMs other than the VM within which the anti-malware routine 470 executes from executing to prevent interference with the copying and/or modification of the IDT 231 and/or the set of ISRs 241.

It should be noted that although the caching of the IDT 231 and/or the set of ISRs 241 by the cache component 476 is specifically depicted, as has been previously discussed, others of the kernel data structures 230 and/or others of the kernel components 240 may be also be cached such that copies thereof are stored within the security cache 486 in addition to one or both of the IDT 231 and the set of ISRs 241. It should also be noted that although the changing of the IDT 231 and/or the set of ISRs 241 by the change component 471 is specifically depicted, as has also been previously discussed, others of the kernel data structures 230 and/or others of the kernel components 240 may also be changed in support of detecting malicious operations by malware and/or in support of the security feature(s) 552 and/or 652.

Returning to FIG. 1, with the IDT 231 and the set of ISRs 241 generated by the operating system 270 and then altered by the anti-malware routine 470, other routines may make use of the set of ISRs 241 to make use of the security feature(s) 552 and/or 652, and/or may make use of the set of ISRs 241 with the anti-malware routine 470 monitoring such use for indications of malicious activity by malware. By way of example, the application routine 770 may be configured to make use of the security feature(s) 552 and/or 652, and may be configured to do so by calling (either directly, or indirectly through a portion of the operating system 270) one or more of the additional ISRs added by the anti-malware routine 470 to the set of ISRs 241. By way of another example, one or more of the kernel components 240 may make calls to ISRs of the set of ISRs 241, and the anti-malware routine 470 may intercept such calls through the earlier made changes to the set of ISRs 241 to analyze the calls to determine whether they are made on behalf of malware or to otherwise perform a malicious operation.

Figure 4:
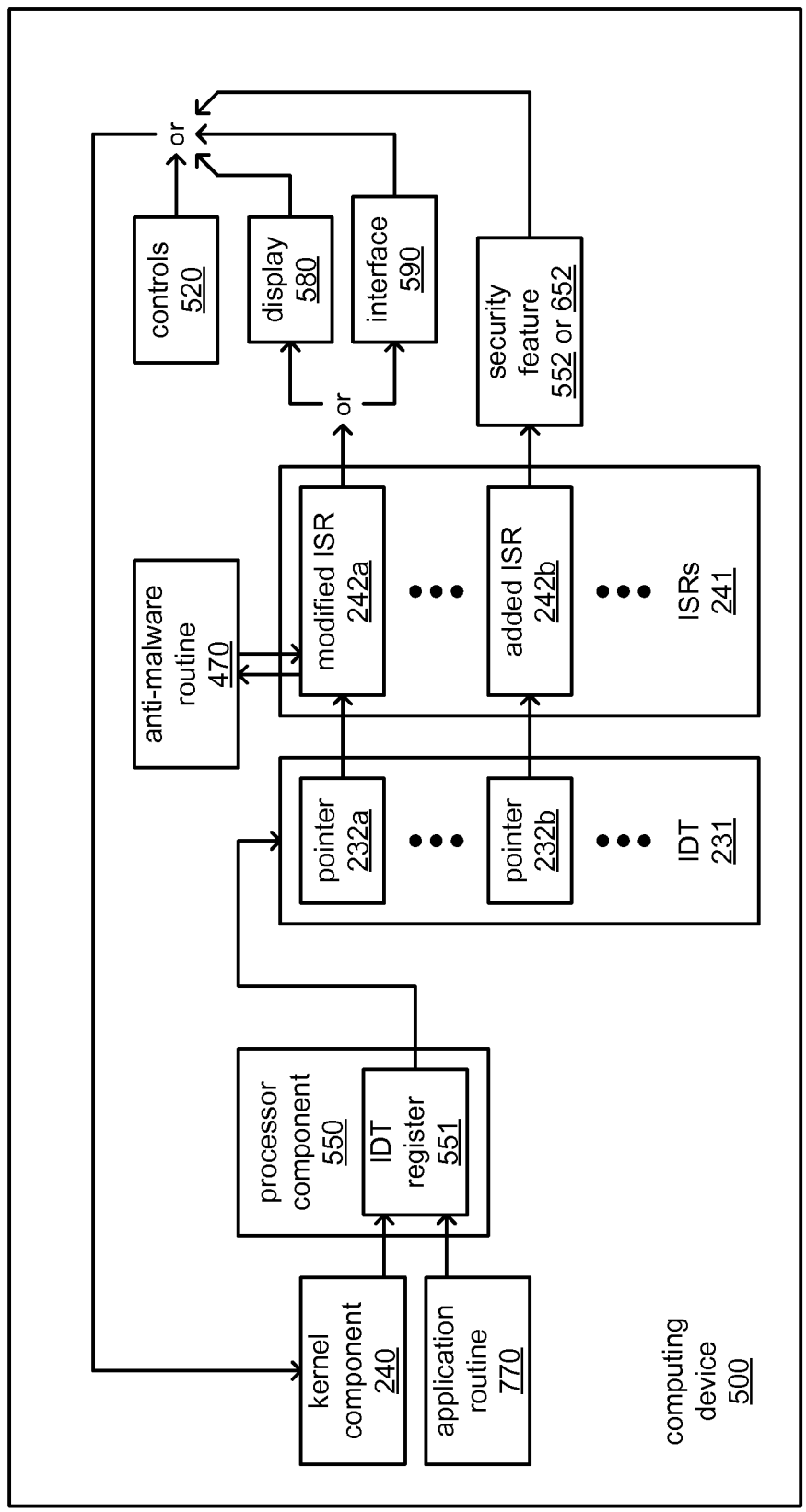
FIG. 4 illustrates example embodiments of using an IDT and a set of ISRs according to an embodiment.

FIG. 4 depicts an example embodiment of the using the IDT 231 and the set of ISRs 241, as modified by the anti-malware routine 470, to in handle interrupt calls. As familiar to those skilled in the art, a call to a particular ISR must be correlated to an address of a location within the storage 560 at which the first executable instruction of that ISR is located. Such correlation may entail retrieving the pointer value of the IDT register 551 that indicates the base address of the IDT 231 (e.g., the location of the first entry of the IDT 231). Using the base address of the IDT 231, the address at which the first executable instruction of the particular ISR is retrieved from a pointer to that particular ISR in an entry within the IDT 231 that correlates to that particular ISR. As depicted, either a kernel component 240 or the application routine 770 may make a call to a particular one of the ISRs of the set of ISRs 241, such as a modified ISR 242a pointed to by a pointer 232a within the IDT 231 or an added ISR 242b pointed to by a pointer 232b added to the IDT 231.

The modified ISR 242a may be an ISR generated and/or otherwise made available for use by a kernel component 240 of the operating system 270. The modified ISR 242a may then have been modified from that original state by the change component 471 of the anti-malware routine 470 to add executable instructions to redirect the flow of execution from the modified ISR 242a to the anti-malware routine 470 to analyze aspects of the interrupt call to determine whether the interrupt has been called to perform a malicious operation. In some embodiments, if the anti-malware routine 470 determines that the interrupt call is to cause a malicious operation to be performed, then the anti-malware routine 470 may cause the flow of execution that includes that interrupt call to be stopped. Alternatively, if the anti-malware routine 470 determines that the interrupt call is not to cause a malicious operation to be performed, then the anti-malware routine 470 may redirect the flow of execution back to the modified ISR 242a to enable performance of the modified ISR 242a followed by a return to the routine that made the interrupt call to the modified ISR 242a (e.g., one of the kernel components 240 or the application routine 770).

The added ISR 242b may be an ISR added to the set of ISRs 241 to enable or in another way support the use of a security feature 552 or 652. The change component 471 of the anti-malware routine 470 may have modified the set of ISRs 241 to expand it to add the added ISR 242b thereto. As has been discussed, the change component 471 may make the corresponding addition of another entry in the IDT 231, including the addition of the pointer 232b pointing to the added ISR 242b. Again, the change component 471 may have also modified the contents of the IDT register 551 to increase the size of the IDT 231 indicated by a value therein to reflect the addition of at the entry that includes the pointer 232b to the added ISR 242b.

As further depicted, a kernel component 240 may make an interrupt call to cause the execution of one of the ISRs of the set of ISRs 241 in response receiving an indication of an occurrence of an event associated with a hardware component of the computing device 500, such as the controls 520, the display 580, the interface 590, and/or one or more of the security features 552 or 652. Alternatively, and as familiar to those skilled in the art, the execution of an ISR of the set of ISRs 241 may be more directly triggered by a hardware-based interrupt signal generated by a hardware component. Regardless of the exact manner in which an event associated with a hardware component brings about execution of an ISR of the set of ISRs 241, such execution of an ISR may lead to signaling the same hardware component or another hardware component to take an action in response to the event. By way of example, an ISR of the set of ISRs 241 may be caused to be executed in response to an indication of the receipt of a signal at the interface 590 from the remote device 100 that is associated with an exchange of the data 130. The signal may be an indication that a security credential has been received from the remote device 100, that a transmission of an encrypted portion of the data 130 to the remote device 100 has been completed, etc. In response to this, the executable instructions of the added ISR 242b may be caused to be executed to employ one of the security features 552 or 652 to verify the received credential, to encrypt another portion of the data 130 for transmission via the interface 590, etc.

Returning to FIG. 1, as previously discussed, over time, one or more of the kernel component 240 may attempt to make modifications to the IDT 231 and/or the set of ISRs 241, and may do so long after both were originally generated following initialization or a reinitialization of the processor component 550 and/or the computing device 500. As recognizable to those skilled in the art, such a change sought to be made by one of the kernel components 240 may be deemed authorized by the guard routine, but may conflict with a change made by the anti-malware routine 470. It may be deemed desirable to, at least initially, prevent such a change by a kernel component 240 from taking immediate effect by providing that kernel component 240 a virtual version of the IDT 231 and/or the set of ISRs 241 to make such changes to. Alternatively or additionally, it may be deemed desirable to enable the anti-malware component 470 to selectively allow or disallow the changes sought to be made by a kernel component 240.

Figure 5:
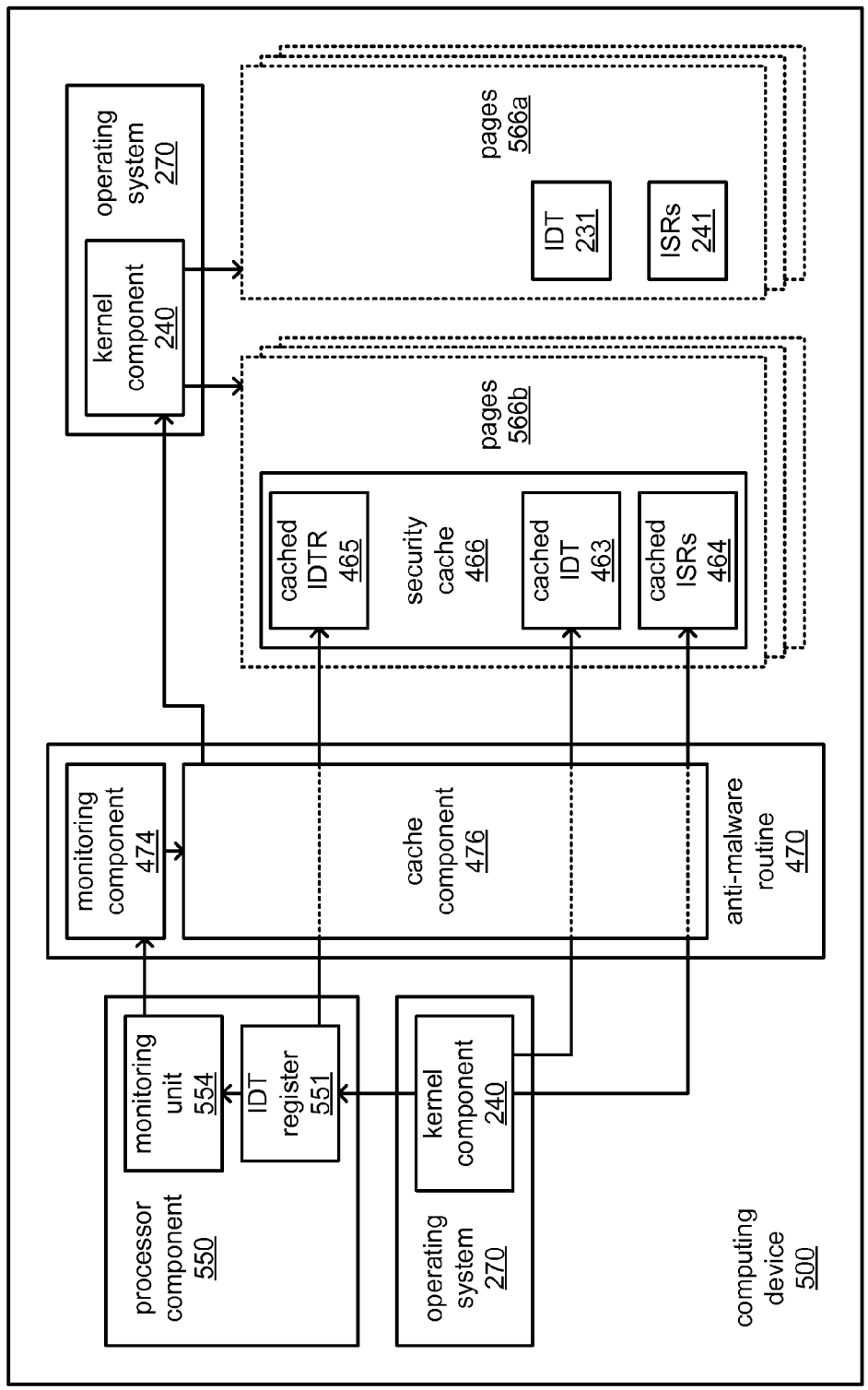
FIG. 5 illustrates an example embodiment of controlling modification of an IDT and a set of ISRs by a kernel component according to an embodiment.

FIG. 5 depicts an example embodiment of controlling modification subsequently made by a kernel component 240 to the IDT 231 and/or the set of ISRs 241. As familiar to those skilled in the art, various ones of the kernel components 240 and/or of the kernel data structures 230 may be protected to at least some degree from unauthorized access by storing them within the storage 560 within particular memory pages that are subject to particular access restrictions, such as one or more of pages 566a as depicted. Further, one or more of the cached IDTR 465, the cached IDT 463 and the cached ISRs 464 may also be given similar protection by storing them within the storage 560 within other particular memory pages that are also subject to particular access restrictions, such as one or more of the pages 566b as depicted. Given the differences in uses to which the IDT 231 and the set of ISRs 241 are put versus the uses to which the cached IDTR 465, the cached IDT 463 and the cached ISRs 464 are put, the particular access restrictions imposed on the pages 566a and 566b, respectively, may be also be different.

As depicted, a kernel component 240 may seek to make a change to the IDT 231 and/or the set of ISRs 241. However, given that the IDT 231 and/or the set of ISRs 241 may include multiple modifications made by the change component 471 of the anti-malware component 470, and given that the changes sought to be made by the kernel component 240 may conflict with one or more of those modifications, it may be deemed undesirable to allow that kernel component to have access to the IDT 231 or the set of ISRs 241. Therefore, the cache component 476 of the anti-malware component 470 may cooperate with another kernel component 240 associated with managing pages of storage space within the storage 560 (or with entirely different routine that is associated with managing such pages of storage space) to provide access to use a storage page swapping mechanism to provide the kernel component 240 seeking to make changes with access to the copies made of the IDT 231 and the set of ISRs 241 prior to modification by the change component 471. Stated differently, the kernel component 240 seeking to make changes is provided with a virtual version of the IDT 231 and the set of ISRs 241 in the form of the cached IDT 463 and the cached set of ISRs 464 stored within the pages 566b, instead of the IDT 231 and the set of ISRs 241 stored within the pages 566a.

Alternatively or additionally, the cache component 476 may analyze the changes sought to be made by that kernel component 240 to selectively allow or disallow those changes to be made to the cached IDT 463 and/or the cached set of ISRs 464. In some embodiments, whether to allow or disallow a change by a kernel component 240 may be based on whether the change would conflict with a change made by the change component 471 to the IDT 231 and/or the set of ISRs 241. In other embodiments, whether to allow or disallow a change by a kernel component 240 may be based on an analysis of the change sought to be made to determine whether the change performs and/or enables performance of a malicious operation.

If the change sought to be made by a kernel component would result in the addition of one or more additional ISRs such that the IDT size indicated within the IDT register 551 is also changed by that kernel component 240, then the monitoring component 474 may convey an indication of the fact of such a change and the new value indicating size to the cache component 476 from the monitoring unit 554. The cache component 476 may employ such an indication from the monitoring component 474 as part of determining whether or not to allow the change sought to be made by that kernel component 240 and/or may store the altered indication of size within the cached IDTR 465. If the cache component 476 determines that a change sought to be made by a kernel component 240 that would require changing the indication of size is to be disallowed, then the cache component 476 may act to cause the size value stored within the IDT register 551 to be changed back to the value it had before that kernel component 240 acted to change it.

Returning to FIG. 1, regardless of whether any changes to the IDT 231 or the set of ISRs 241 are ever sought to be made by a kernel component 240 or any other routine other than the anti-malware routine 470, as previously discussed, the anti-malware routine 470 may respond to an indication that the guard routine 370 is about to inspect one or more of the kernel components 240 and/or one or more of the kernel data structures 230 by undoing the changes made by the anti-malware routine 470 to the IDT 231 and/or the set of ISRs 241. Again, during one of the recurring inspections of kernel components 240 and/or kernel data structures 230, the guard routine 370 is presented with at least the IDT 231 and the set of ISRs 241 in the state that they would be expected to be in were the anti-malware routine 470 not present and/or not being executed within the computing device 500.

Figure 6:
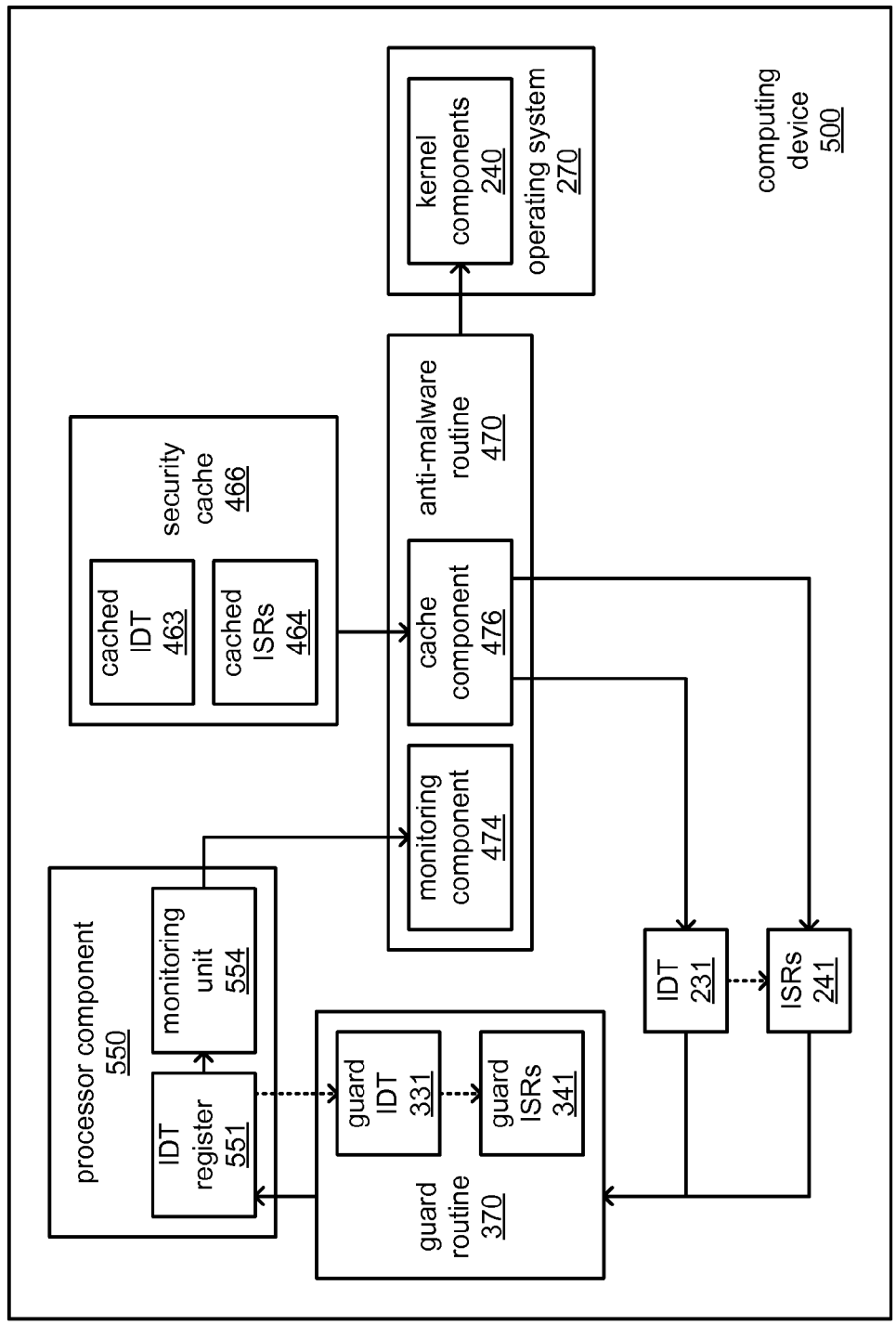
FIG. 6 illustrates an example embodiment of undoing modifications to an IDT and a set of ISRs in preparation for an inspection of kernel components according to an embodiment.

FIG. 6 depicts an example embodiment of undoing modifications made to the IDT 231 and/or the set of ISRs 241 in preparation for an inspection by the guard routine 370. In executing the guard routine 370 to prepare to perform an inspection, the processor component 550 may modify the contents of the IDT register 551 by loading a pointer value to point to where the guard IDT 331 is stored within the storage 560, instead of to where the IDT 231 is stored within the storage 560. The processor component 550 may further modify the contents of the IDT register 551 by loading a value indicating the size of the guard IDT 331, instead of the size of the IDT 231. Again, in so doing, a LIDT instruction may be used to so modify the contents of the IDT register 551. Not unlike the manner in which the size of the IDT 231 may be specified in the IDT register 551, the size of the guard IDT 331 may be specified as a quantity of bits, bytes, words, doublewords, quadwords, etc. Alternatively, the size of the guard IDT 331 may be specified as a quantity of entries, each of which may include a pointer to a separate ISR of the set of guard ISRs 341.

The processor component 550 may then provide the monitoring component 474 with an indication from the monitoring unit 554 that a pointer value and a size value have been loaded into the IDT register 551. In response, the monitoring component 474 may retrieve that pointer value and/or that size value, and may analyze at least the size value to determine whether the loading of these values into the IDT register 551 was done in preparation for an inspection of kernel components 240 and/or kernel data structures 230 by the guard routine 370. More specifically, the monitoring component 474 may compare the size value retrieved from the IDT register 551 to a known size of at least one version of the guard IDT 331. As previously discussed, the quantity of ISRs making up the set of guard ISRs 341 may be considerably less than the quantity of ISRs making up the set of ISRs 241. With fewer ISRs making up the set of guard ISRs 341, the size of the guard IDT 331 may be considerably less than the size of the IDT 231. It should be noted that over time, as new versions of the guard routine 370 are made available for use in computing devices such as the computing device 500, there may be a new version of the guard IDT 331 with a different size such that there may be more than one known size for the guard IDT 331. If the size value retrieved from the IDT register 551 does not match any known size of any version of the guard IDT 331, then the monitoring component 474 may determine that the change made to the contents of the IDT register 551 is not in preparation for an inspection by the guard routine 370. In response to thereby determining that an inspection by the guard routine is not about to occur, the monitoring component 474 may refrain from signaling either of the cache component 476 or the change component 471 to take any action. However, if the size value retrieved from the IDT register 551 matches a known size of at least one version of the guard IDT 331, then the monitoring component 474 may determine that the change made to the contents of the IDT register 551 is in preparation for the guard routine 370 perform an inspection, and thereby determine that an inspection is about to occur.

As an alternative mechanism to detect an impending inspection in other embodiments, the monitoring component 474 may compare the size value retrieved from the IDT register 551 to an expected size value associated with the IDT 231 to determine if the size value retrieved from the IDT register 551 is less than that expected size. Again, the size value within the IDT register 551 may normally be set to an expected maximum value indicating an upper limit on the size of the IDT 231 during normal operation of the computing device 500. Also again, the quantity of ISRs making up the set of guard ISRs 341 may be considerably less than the quantity of ISRs making up the set of ISRs 241 such that the size of the guard IDT 331 may be considerably less than the size of the IDT 231, and thus, the size value loaded into the IDT register 551 may be far smaller than the size value normally within the IDT register 551 and associated with the IDT 231. If the size value retrieved from the IDT register 551 is the expect size value that is associated with the IDT 231 and is normally within the IDT register 551 during normal operation of the computing device 500, then a determination may be made that there is no impending inspection, and the monitoring component 474 may refrain from signaling either of the cache component 476 or the change component 471 to take any action. However, if the size value retrieved from the IDT register 551 is less than the expected size value that is normally loaded therein and associated with the IDT 231 during normal operation of the computing device 500, then the monitoring component 474 may determine that an inspection by the guard routine 370 is about to occur.

In response to a determination by the monitoring component 474 that an inspection is about to occur, the monitoring component 474 may signal the cache component 476 to undo the changes earlier made by the change component 471 to the IDT 231 and/or the set of ISRs 241. The cache component 476 may do so by copying the cached IDT 463 and the cached set of ISRs 464 back to the locations within the storage 560 at which the IDT 231 and the set of ISRs 241, respectively, are stored. In so doing, the cache component 476 effectively replaces the versions of the IDT 231 and the set of ISRs 241 that include the modifications earlier made by the change component 471 with versions of the IDT 231 and the set of ISRs 241 that do not include those modifications. As a result, the guard routine 370 will not detect the modifications earlier made by the change component 471, which the guard routine 370 might have determined to be unauthorized. This avoids the possibility that the guard routine 370 may take an undesirable action in response to determining that unauthorized changes have been made to one or both of the IDT 231 and the set of ISRs 241.

As the cache component 476 copies the cached IDT 463 and/or the cached set of ISRs 464 back to the IDT 231 and/or the set of ISRs 241, respectively, the anti-malware routine 470 may cooperate with a kernel component 240 or another routine otherwise associated with the operating system to prevent or delay execution of one or more other routines (e.g., the application routine 770) to avoid the possibility of at least some interrupt calls being made. For example, the anti-malware routine 470 may cooperate with a component or other routine associated with the operating system 270 that implements VM support to at least momentarily prevent software executed within one or more VMs from executing to prevent interference with the copying operation to undo the changes made to the IDT 231 and/or the set of ISRs 241 earlier by the change component 471.

As has been previously discussed, there may be occasions when a kernel component 240 seeks to modify one or both of the IDT 231 and the set of ISRs 241 at times when the guard routine 370 is not performing an inspection and when the IDT 231 and/or the set of ISRs 241 have already been modified by the change component 471. Again, in such instances, the cache component 476 may cooperate with another kernel component 240 or some other routine associated with the operating system 270 to manage storage pages of storage space within the storage 560 (as discussed with regard to FIG. 5) to give the kernel component 240 that seeks to make such changes access to the cached IDT 463 and/or the cached set of ISRs 464, instead of access to the IDT 231 and/or the set of ISRs 241. As a result, the changes sought to be made by that kernel component 240 are made to the cached IDT 463 and/or the cached set of ISRs 464, instead of being made to the IDT 231 and/or the set of ISRs 241. Further, the guard routine 370 is subsequently presented with the changes made by that kernel component 240 when the cached IDT 463 and/or the cached set of ISRs 464 are copied back to the IDT 231 and the set of ISRs 241 to undo the modifications made by the change component 471, thereby exposing the changes made by that kernel component 240 to the inspection performed by the guard routine 370.

In this way, the anti-malware routine 470 is able to co-exist with the guard routine 370 within the computing device 500. The guard routine 370 is still able to perform its inspections to look for changes made to kernel components 240 and/or kernel data structures 230, including changes actually made by one or more of the kernel components 240 themselves, but is prevented from detecting the changes made by the anti-malware routine 470 and/or in support of using the security feature(s) 552 and/or 652.

It should be noted that although the copying of cached versions of the IDT 231 and/or the set of ISRs 241 by the cache component 476 back to the locations at which the IDT 231 and/or the set of ISRs 241 are maintained within the storage 560 is specifically depicted, cached versions of others of the kernel data structures 230 and/or others of the kernel components 240 may be also be copied back to the locations within the storage 560 from which they were originally copied. Just as such copying of the cached versions of the IDT 231 and/or the set of ISRs 241 may be performed to prevent changes made thereto by the change component 471 of the anti-malware routine 470 from being detected by the guard routine 370, such copying of cached versions of others of the kernel data structures 230 and/or of the kernel components 240 may also be performed to similarly prevent changes similarly made thereto from also being detected by the guard routine 370.

Following completion of an inspection by the guard routine 370, and presuming that the guard routine does not identify an unauthorized change made to the IDT 231 and/or the set of ISRs 241 by another routine, the need for the anti-malware routine 470 to continue to hide the changes it makes to the IDT 231 and/or the set of ISRs 241 ends, at least until the commencement of another such inspection. In response to an indication of the conclusion of such an inspection, the anti-malware routine 470 may reinstate its changes to at least the IDT 231 and/or the set of ISRs 241.

Figure 7:
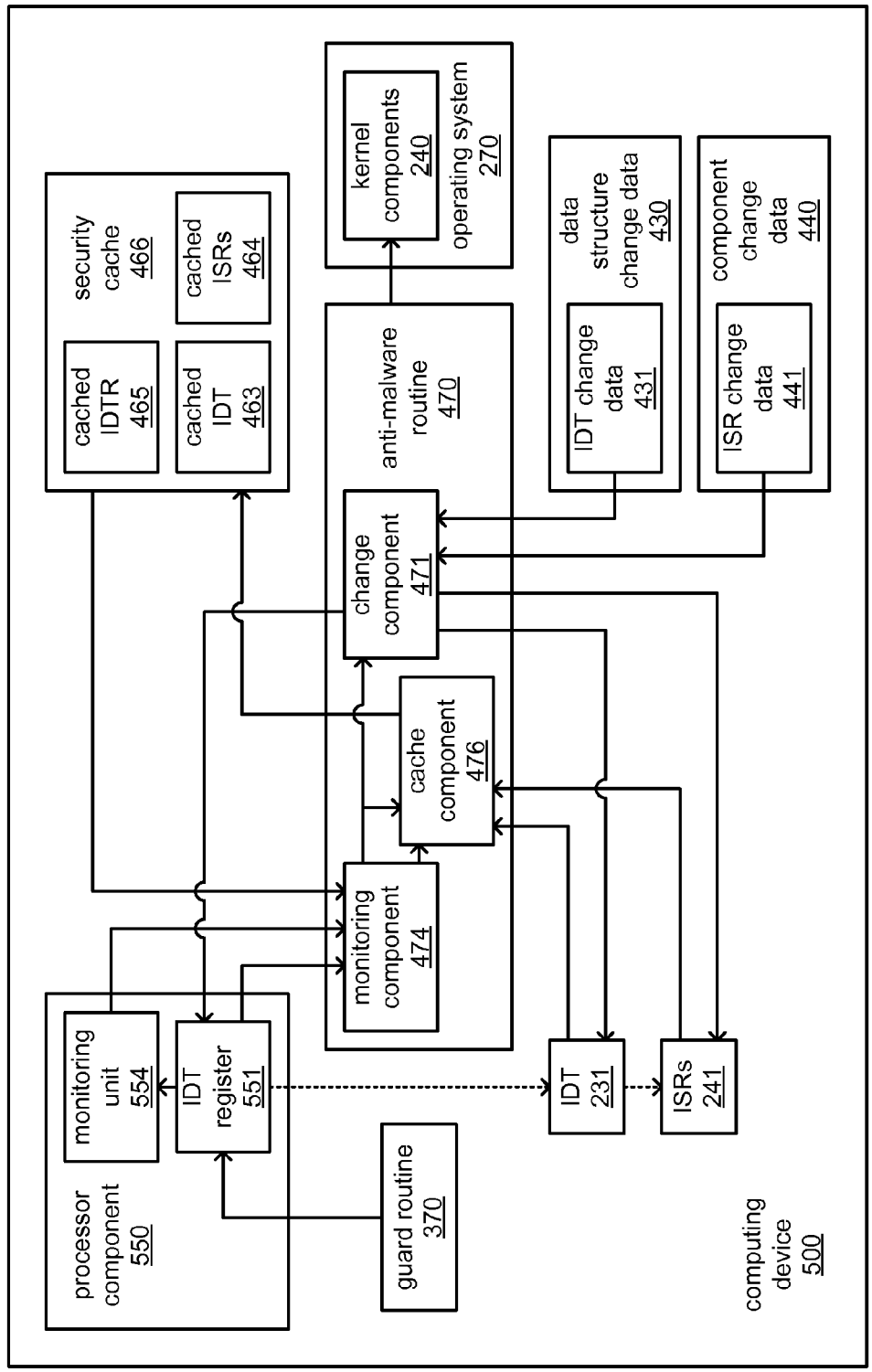
FIG. 7 illustrates an example embodiment of reinstating modifications to an IDT and a set of ISRs following an inspection of kernel components according to an embodiment.

FIG. 7 depicts an example embodiment of reinstating modifications earlier made by the change component 471 to the IDT 231 and/or the set of ISRs 241 following completion of an inspection by the guard routine 370. In further executing the guard routine 370 to conclude an inspection, the processor component 550 may again modify the contents of the IDT register 551 by loading the pointer value that points to where the IDT 231 is stored within the storage 560 back into the IDT register 551 in place of the pointer value that points to where the guard IDT 331 is stored within the storage 560. The processor component 550 may further modify the contents of the IDT register 551 by loading a value indicating the size of the IDT 231, instead of the size of the guard IDT 331. Again, in so doing, a LIDT instruction may be used to so modify the contents of the IDT register 551.

The processor component 550 may then provide the monitoring component 474 with an indication from the monitoring unit 554 that a pointer value and a size value have been loaded into the IDT register 551. In response, the monitoring component 474 may retrieve that pointer value and/or that size value, and may analyze at least the size value to determine whether the loading of these values into the IDT register 551 was done in concluding an inspection of kernel components 240 and/or kernel data structures 230 by the guard routine 370.

In some embodiments, the monitoring component 474 may compare the size value retrieved from the IDT register 551 to the size value stored as part of the cached IDTR 465 that indicates the size of the IDT 231 without the modifications made by the change component 471 to determine if these size values match. If the size value retrieved from the IDT register 551 does not match the size value stored as part of the cached IDTR 465, then the monitoring component 474 may determine that an inspection by the guard routine 370 is still underway. In response to determining that an inspection by the guard routine is still ongoing, the monitoring component 474 may refrain from signaling either of the cache component 476 or the change component 471 to take any action. However, if the size value retrieved from the IDT register 551 matches the size value stored as part of the IDTR 465, then the monitoring component 474 may determine that the change made to the contents of the IDT register 551 indicates that the guard routine 370 has concluded its inspection.

As an alternative mechanism to detect the conclusion of an inspection in other embodiments, the monitoring component 474 may compare the size value retrieved from the IDT register 551 to known size(s) of one or more versions of the guard IDT 331 to determine if the size value retrieved from the IDT register 551 is larger than any known size of any version of the guard IDT 331. Again, the quantity of ISRs making up the set of guard ISRs 341 may be considerably less than the quantity of ISRs making up the set of ISRs 241 such that the size of the guard IDT 331 may be considerably less than the size of the IDT 231. If the size value retrieved from the IDT register 551 still matches a known size of at least one version of the guard IDT 331, then the monitoring component 474 may determine that an inspection by the guard routine 370 is still underway. In response to determining that an inspection by the guard routine is still ongoing, the monitoring component 474 may refrain from signaling either of the cache component 476 or the change component 471 to take any action. However, if the size value retrieved from the IDT register 551 is now considerably larger than any known size of a version of the guard IDT 331, then the monitoring component 474 may determine that the change made to the contents of the IDT register 551 indicates that the guard routine 370 has concluded its inspection.

As another alternative mechanism to detect conclusion of an inspection in still other embodiments, the monitoring component 474 may compare the size value retrieved from the IDT register 551 to an expected size value associated with the IDT 231 to determine if the size value retrieved from the IDT register 551 matches that expected size. Again, the size value within the IDT register 551 may normally be set to an expected maximum value indicating an upper limit on the size of the IDT 231 during normal operation of the computing device 500. If the size value retrieved from the IDT register 551 does not match the expect size value that is associated with the IDT 231 and is normally within the IDT register 551 during normal operation of the computing device 500, then the monitoring component 474 may determine that an inspection by the guard routine 370 is still underway, and may refrain from signaling either of the cache component 476 or the change component 471 to take any action. However, if the size value retrieved from the IDT register 551 matches the expected size value that is normally loaded therein and associated with the IDT 231 during normal operation of the computing device 500, then the monitoring component 474 may determine that the guard routine 370 has concluded its inspection.

In response to determining that the inspection that was underway is now concluded, the monitoring component 474 may provide the pointer value and/or the size value retrieved from the IDT register 551 to the cache component 476. The cache component 476 may again make use of at least the pointer value to access the IDT 231 and the set of ISRs 241, make copies of both, and store those copies within the storage 560 as the cached IDT 463 and the cached set of ISRs 464 of the security cache 466. Again, the IDT 231 includes pointers to the locations of the first executable instruction of each ISR of the set of ISRs 241, thereby enabling the cache component to retrieve a copy of each of those ISRs for storage as part of the cached set of ISRs 464. The cache component 476 may also store a copy of that pointer value and/or the size value as a cached IDTR 465 of the security cache 466.

The monitoring component 474 may also provide at least the pointer value retrieved from the IDT register 551 to the change component 471 to use in accessing the IDT 231 and/or the set of ISRs 241 to reinstate the modifications that the change component 471 had earlier made thereto. Again, the IDT 231 includes pointers to the locations of the first executable instruction of each ISR of the set of ISRs 241, thereby enabling the change component to access each of the ISRs of the set of ISRs 241 that the change component 471 is to modify. In so doing, the change component 471 may again retrieve indications of the modifications to make to the IDT 231 from the IDT change data 431 of the indications of data structure change data 430 stored within the storage 560. Correspondingly, the change component 471 may also retrieve indications of modifications to make to the set of ISRs 241 from the ISR change data 441 of the indications of component change data 440 stored within the storage 560. Again, the changes that may be made to the set of ISRs 241 may be modifications to add one or more additional ISRs to provide support for the use of the security feature(s) 552 and/or 652. Correspondingly, there may also be modifications to the IDT 231 to add one or more additional entries to add pointers to the one or more additional ISRs.

Again, although the caching of the IDT 231 and/or the set of ISRs 241 by the cache component 476 is specifically depicted, others of the kernel data structures 230 and/or others of the kernel components 240 may be also be cached such that copies thereof are stored within the security cache 486 in addition to one or both of the IDT 231 and the set of ISRs 241. It should also again be noted that although the changing of the IDT 231 and/or the set of ISRs 241 by the change component 471 is specifically depicted, others of the kernel data structures 230 and/or others of the kernel components 240 may also be changed in support of detecting malicious operations by malware and/or in support of the security feature(s) 552 and/or 652.

Returning to FIG. 1, with the IDT 231 and the set of ISRs 241 again altered by the anti-malware routine 470, other routines (e.g., the application routine 770) may again make use of the set of ISRs 241 to make use of the security feature(s) 552 and/or 652. Alternatively or additionally, other routines (e.g., the application routine 770) may again make use of the set of ISRs 241 with the anti-malware routine 470 monitoring such use for indications of malicious activity by malware.

Although each of the processor components 550 and 650 may include any of a variety of types of processor, it is envisioned that the processor component 650 of the controller 600 (if present) may be somewhat specialized and/or optimized to perform tasks related to graphics and/or video. More broadly, it is envisioned that the controller 600 embodies a graphics subsystem of the computing device 500 to enable the performance of tasks related to graphics rendering, video compression, image rescaling, etc., using components separate and distinct from the processor component 650 and its more closely related components.

In various embodiments, each of the storages 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8:
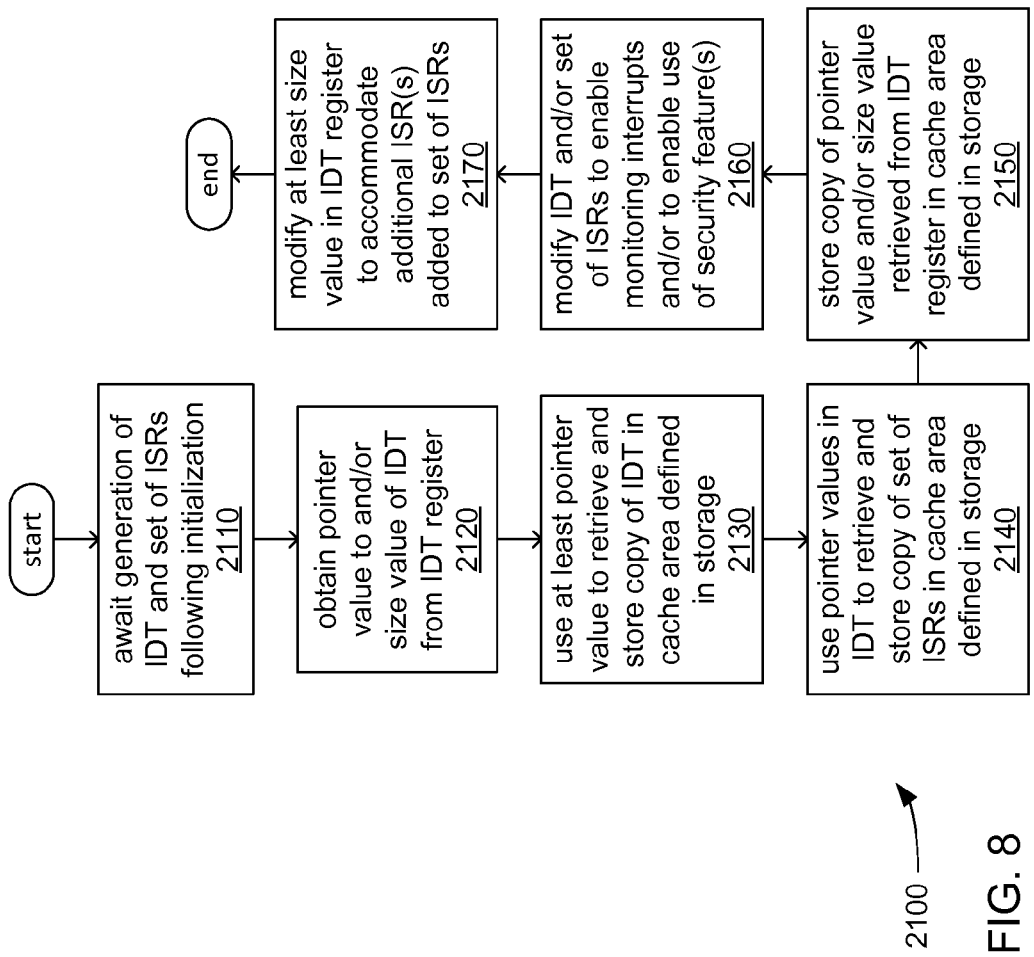
FIGS. 8-11 each illustrate a logic flow according to an embodiment.

FIG. 8 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the anti-malware routine 470, and/or performed by other component(s) of the computing device 500.

As part of initializing a computing device after either a resetting of the computing device or a powering on of the computing device, a processor component of the computing device (e.g., the processor component 550 of the computing device 500) may execute various kernel components of an operating system (e.g., the kernel components 240 of the operating system 270) to perform various initialization tasks, including generating an interrupt descriptor table (IDT) and a set of interrupt service routines (ISRs) for use during normal operation of the computing device (e.g., the IDT 231 and the set of ISRs 241). At 2110, the processor component may await completion of such initialization tasks, including the generation of the IDT and set of ISRs.

At 2120, upon the generation of the IDT and the set of ISRs, the processor component, in executing a portion of an anti-malware routine (e.g., the anti-malware routine 470), may obtain a pointer value that points to the IDT and/or a size value that indicates the size of the IDT from an IDT register of the processor component. Such retrieval may be triggered by an indication from a monitoring unit of the processor component that pointer and/or size values have been loaded into the IDT register (e.g., the monitoring unit 554 and the IDT register 551). Again, the size value may indicate the current size of the IDT or a maximum permissible size of the IDT.

At 2130, the processor component may use at least the pointer value to retrieve and store a copy of the IDT in a cache area defined in a storage accessible to the processor component (e.g., the security cache 466 defined within the storage 560) as a cached IDT. At 2140, the processor component may use the pointer values within the entries of the IDT to retrieve and store copies of the ISRs making up the set of ISRs in the cache area as a cached set of ISRs. At 2150, the processor component may store copies of the pointer and/or size values earlier retrieved from the IDT register in the cache area as a cached IDTR. Stated differently, the processor component may store copies of the IDT, the set of ISRs and the values within the IDT register in the cache area to preserve their state as originally generated by one or more kernel components.

At 2160, the processor component may make various modifications to the IDT and/or the set of ISRs to enable the anti-malware routine to monitor attempted execution of one or more of the ISRs for indications of a malicious operation and/or to add one or more ISRs to the set of ISRs to support the use of one or more hardware-based security features built into the processor component and/or into another circuit of the computing device. As previously discussed, however, the processor component may also make various modifications to other kernel data structures and/or kernel components (e.g., the kernel data structures 230 and/or the kernel components 240) beyond the IDT and/or the set of ISRs, respectively, in support of such monitoring and/or additional security features.

At 2170, the processor component may modify at least the size value within the IDT register as part of enabling the addition of one or more entries to the IDT that include pointer(s) to the one or more ISRs that may be added to the set of ISRs. However, in some embodiments previously discussed, there may be an expected size value that is expected to remain loaded within the IDT register during normal operation of the computing device. Further, that expected size value may specify an upper limit on the size of the IDT that may already accommodate whatever modifications are sought to be made by the anti-malware routine such that the size value within the IDT register need not be modified to enable the addition of one or more entries to the IDT.

Figure 9:
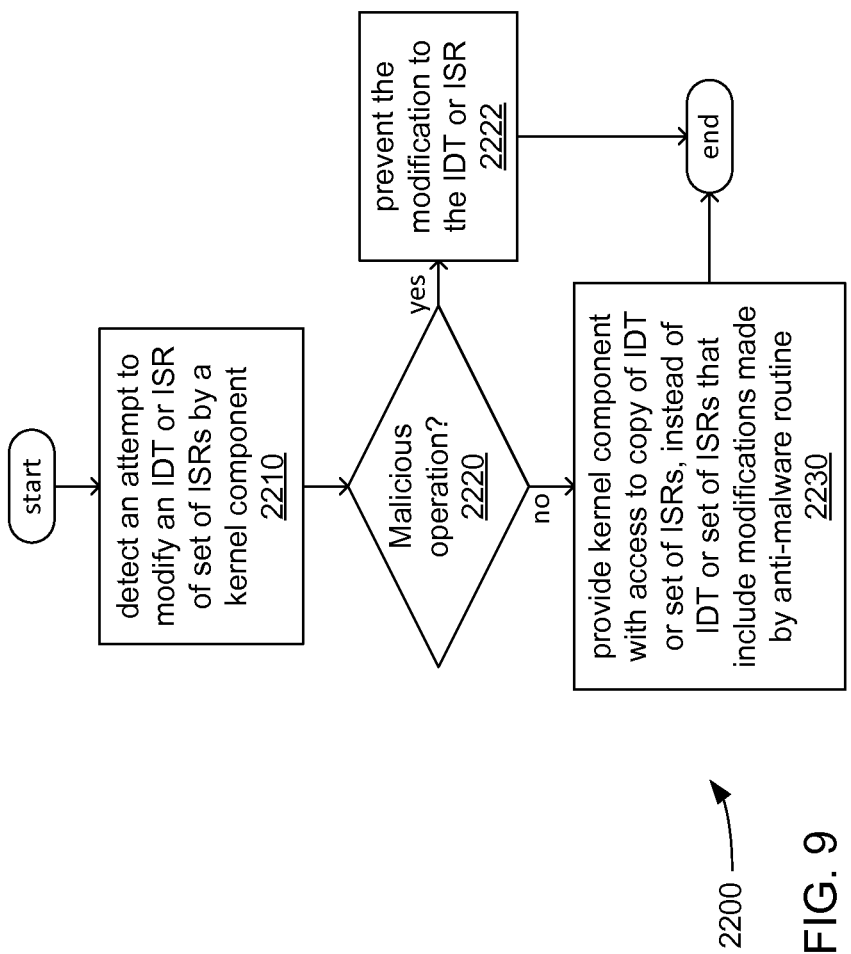

FIG. 9 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the anti-malware routine 470, and/or performed by other component(s) of the computing device 500.

A processor component of the computing device (e.g., the processor component 550 of the computing device 500) may execute various kernel components of an operating system (e.g., the kernel components 240 of the operating system 270) to perform various tasks in support of executing the operating system to provide an environment in which to execute other routines. At 2210, in executing a portion of an anti-malware routine (e.g., the anti-malware routine 470), the processor component may detect an attempt by a kernel component to modify an IDT or set of ISRs (e.g., the IDT 231 and the set of ISRs 241).

At 2220, the processor component may analyze the modification sought to be made by the kernel component to determine whether that modification is a malicious operation being attempted as part of performing a takeover of the computing device, a theft of data stored therein, or other malicious act. If it is determined that the modification sought to be made is such a malicious operation, then the processor component may prevent that modification at 2222.

However, if it is determined that the modification sought to be made is not such a malicious operation, then the processor component may provide the kernel component that seeks to make the modification with access to cached copies of the IDT and/or the set of ISRs to make that modification to at 2230, instead of the actual IDT and the set of ISRs that are currently in use. As previously discussed, the processor component, in executing the anti-malware routine, may have made various modifications to the IDT and/or the set of ISRs as part of monitoring for malicious operations and/or to support the use of hardware-based security feature(s). As has also been explained, such modifications as a kernel component may seek to make at a later time from when the IDT and the set of ISRs were originally generated by one or more kernel components may conflict with the modifications made to the IDT and the set of ISRs for the anti-malware routine.

Figure 10:
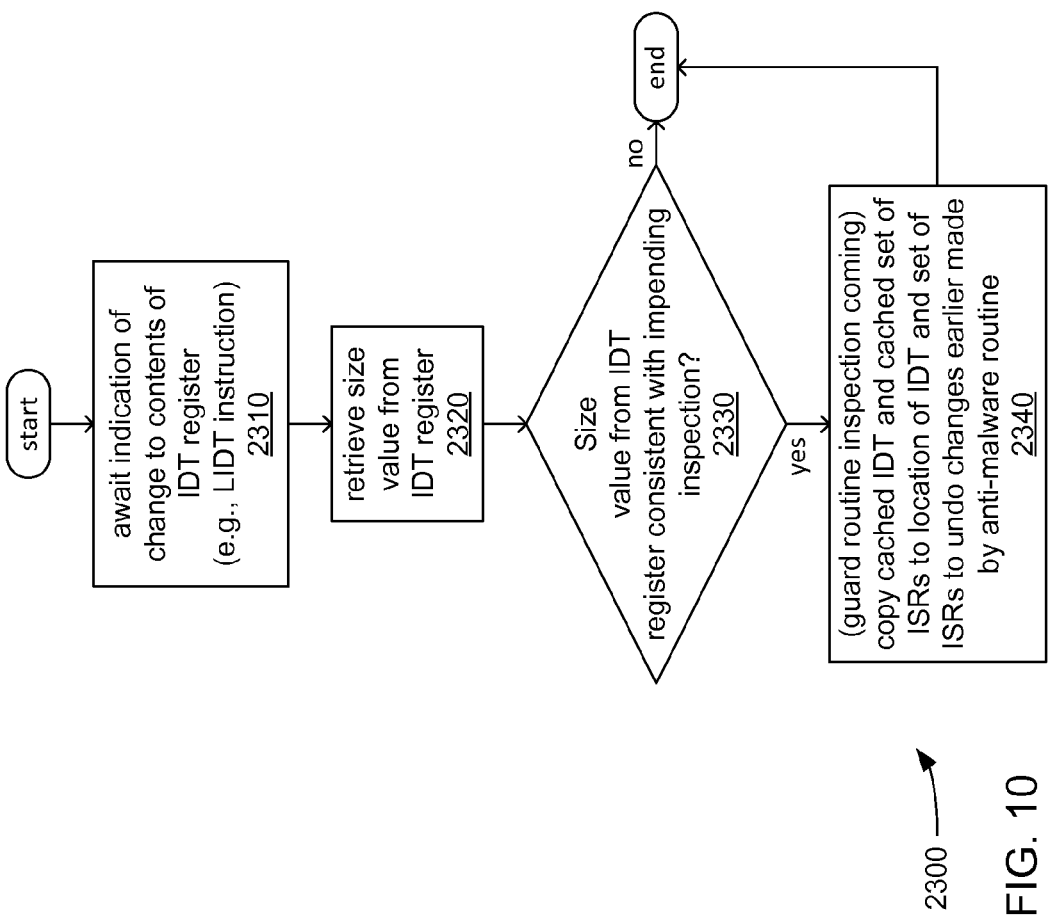

FIG. 10 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least the anti-malware routine 470, and/or performed by other component(s) of the computing device 500.

A processor component of the computing device (e.g., the processor component 550 of the computing device 500) may execute various routines associated with an operating system including a guard routine (e.g., the guard routine 370 of the operating system 270) to perform various tasks in support of protecting the integrity of the operating system. At 2310, the processor component may await an indication of a change to the contents of an IDT register of the processor component (e.g., an indication from the monitoring unit 554 of the IDT register 551). As has been discussed, such a change to the IDT register may be effected using a "load IDT" (LIDT) instruction.

At 2320, in executing a portion of an anti-malware routine (e.g., the anti-malware routine 470), the processor component may retrieve a pointer value that points to the IDT and/or a size value that indicates the size of the IDT from the an IDT register of the processor component in response to the indication of the change to the contents of the IDT register. As has been discussed, such retrieval of the pointer and/or size values from the IDT register may be effected using a "save IDT" (SIDT) instruction.

At 2330, the processor component may check the size value retrieved from the IDT register to determine whether the retrieved size value is consistent with an inspection of kernel data structures and/or kernel components (e.g., the kernel data structures 230 and/or the kernel components 240) about to be performed by the guard routine. More specifically, the processor component may check the retrieve size value to determine whether it is consistent with use of the IDT or with use of a guard IDT that is employed by the guard routine in place of the IDT during times when the guard routine performs an inspection.

As has been discussed, the check at 2330 may entail a comparison of the size value retrieved from the IDT register to one or more known sizes of one or more versions of a guard IDT that the guard routine may use while performing an inspection to determine whether the guard IDT is about to be used. If the size value retrieved from the IDT register matches a known size of one or more versions of the guard IDT such that a version of the guard IDT is about to be used, then it may be determined that execution of the guard routine by the processor component is about to result in an inspection being performed by the guard routine.

Alternatively, as has also been discussed, the check at 2330 may entail a comparison of the size value retrieved from the IDT register to an expected size value that is associated with the IDT and is expected to be loaded into the IDT register during normal operation of the computing device, and not during an inspection performed by the guard routine. If the size value retrieved from the IDT register matches that expected size value such that the IDT is still being used, then it may be determined that an inspection by the guard routine is not about to be performed.

At 2340, in response to the determination that an inspection by the guard routine is about to be performed, the processor component may copy cached versions of the IDT and set of ISRs back to the locations of the IDT and set of ISRs within a storage accessible to the processor component (e.g., the storage 560) to overwrite the IDT and set of ISRs with the cached versions. As previously discussed, versions of the IDT and the set of ISRs that do not include modifications by the anti-malware routine may be cached prior to the IDT and the set of ISRs being modified by the anti-malware routine to include those modifications. By copying the cached versions back over the IDT and set of ISRs, the modifications made by the anti-malware routine are effectively undone and are not detected in the inspection by the guard routine.

As also previously discussed, there may also be copying of cached versions of others of the kernel data structures and/or the kernel components back to the locations within the storage from which the cached versions were originally copied before changes were made thereto by the anti-malware routine. As with the IDT and set of ISRs, this copying of cached versions of other kernel data structures and/or components may be also be done to prevent those changes by the anti-malware routine thereto from being detected by the guard component during the inspection.

Figure 11:
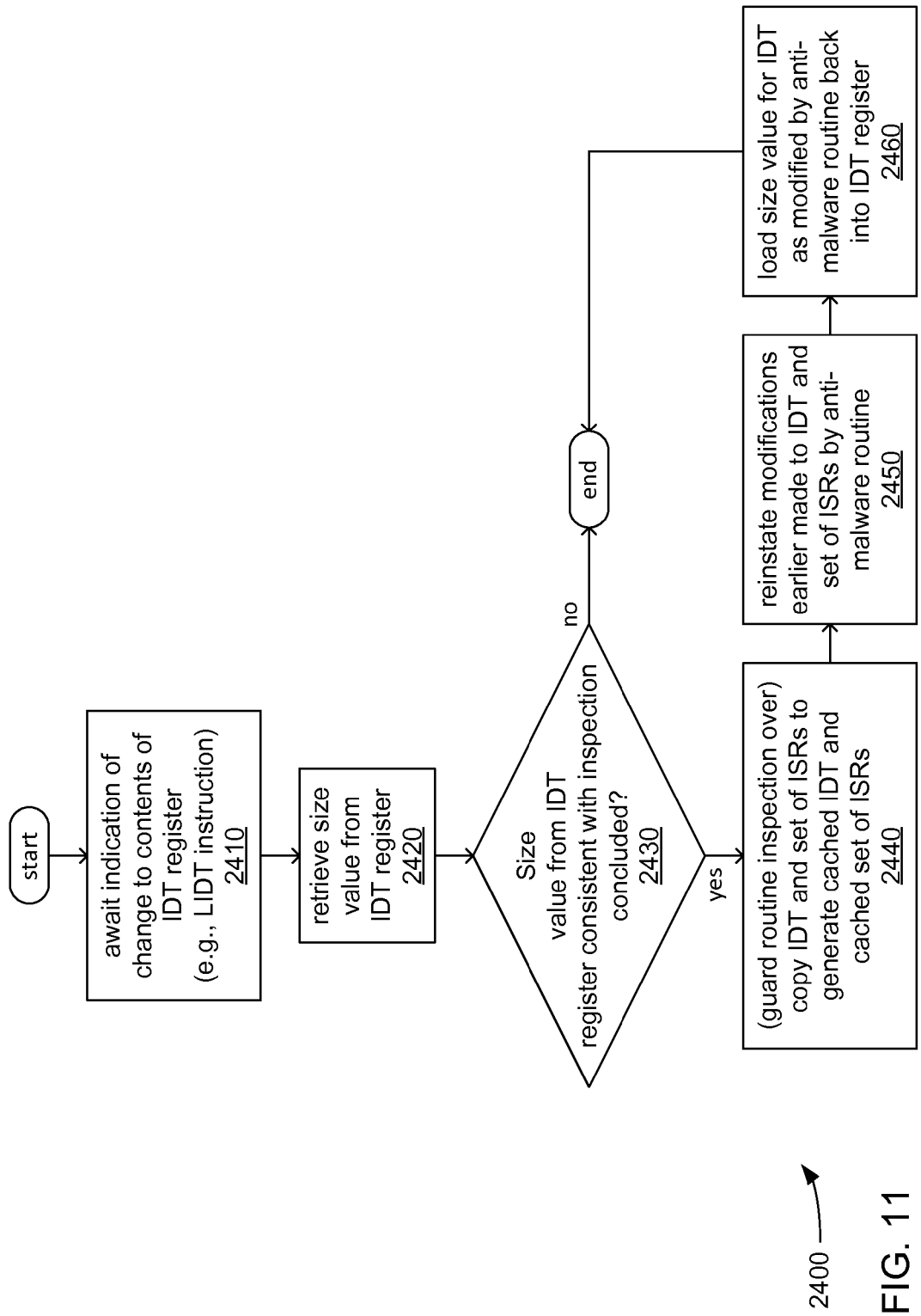

FIG. 11 illustrates one embodiment of a logic flow 2400. The logic flow 2400 may be representative of some or all of the operations executed by one or more embodiments described herein. More specifically, the logic flow 2400 may illustrate operations performed by the processor component 550 in executing at least the anti-malware routine 470, and/or performed by other component(s) of the computing device 500.

Again, a processor component of the computing device (e.g., the processor component 550 of the computing device 500) may execute various routines associated with an operating system including a guard routine (e.g., the guard routine 370 of the operating system 270) to perform various tasks in support of protecting the integrity of the operating system. At 2410, with an inspection of kernel components and/or data structures of the operating system possibly still underway, the processor component may await an indication of a change to the contents of an IDT register of the processor component (e.g., an indication from the monitoring unit 554 of the IDT register 551). At 2420, in executing a portion of an anti-malware routine (e.g., the anti-malware routine 470), the processor component may retrieve a pointer value that points to the IDT and/or a size value that indicates the size of the IDT from the an IDT register of the processor component in response to the indication of the change to the contents of the IDT register.

At 2430, the processor component may check the size value retrieved from the IDT register to determine whether the retrieved size value is consistent with an inspection of kernel data structures and/or kernel components (e.g., the kernel data structures 230 and/or the kernel components 240) having been concluded. More specifically, the processor component may check the retrieve size value to determine whether it is consistent with continued use of the guard IDT which is used by the guard routine during an inspection, or with a return to use of the IDT.

As has been discussed, the check at 2430 may entail a comparison of the size value retrieved from the IDT register to a cached version of the size value maintained in a cache area of a storage of the computing device (e.g., the security cache 466 of the storage 560) at which previously cached versions of the IDT and/or a set of ISRs may also be stored to determine whether a version of the guard IDT is still being used. If the size value retrieved from the IDT register matches the cached version of the size value such that no version of the guard IDT is being used anymore, then it may be determined that execution of the guard routine by the processor component to perform an inspection is over.

Alternatively, as has also been discussed, the check at 2430 may entail a comparison of the size value retrieved from the IDT register to an expected size value that is associated with the IDT and is expected to be loaded into the IDT register during normal operation of the computing device, and not during an inspection performed by the guard routine. If the size value retrieved from the IDT register matches that expected size value such that the IDT is still being used, then it may be determined that performance of an inspection is over.

At 2440, in response to the determination that the inspection by the guard routine that was underway is now concluded, the processor component may copy the IDT and the set of ISRs to the cached area as the new cached versions of the IDT and set of ISRs, thereby overwriting the previous cached versions of the IDT and set of ISRs. At 2450, the processor component may then reinstate the modifications earlier made to the IDT and the set of ISRs by the anti-malware routine. As also previously discussed, there may also be a reinstating of modifications made by the anti-malware routine to others of the kernel data structures and/or the kernel components.

At 2460, the processor component, in some embodiments, may load at least a new size value into the IDT register that may reflect the size of the IDT with the reinstated modifications. However, in some embodiments previously discussed, there may be an expected size value that is expected to remain loaded within the IDT register during normal operation of the computing device. Further, that expected size value may specify an upper limit on the size of the IDT that may already accommodate whatever modifications are sought to be made by the anti-malware routine such that the size value within the IDT register need not be modified to enable the addition of one or more entries to the IDT.

Figure 12:
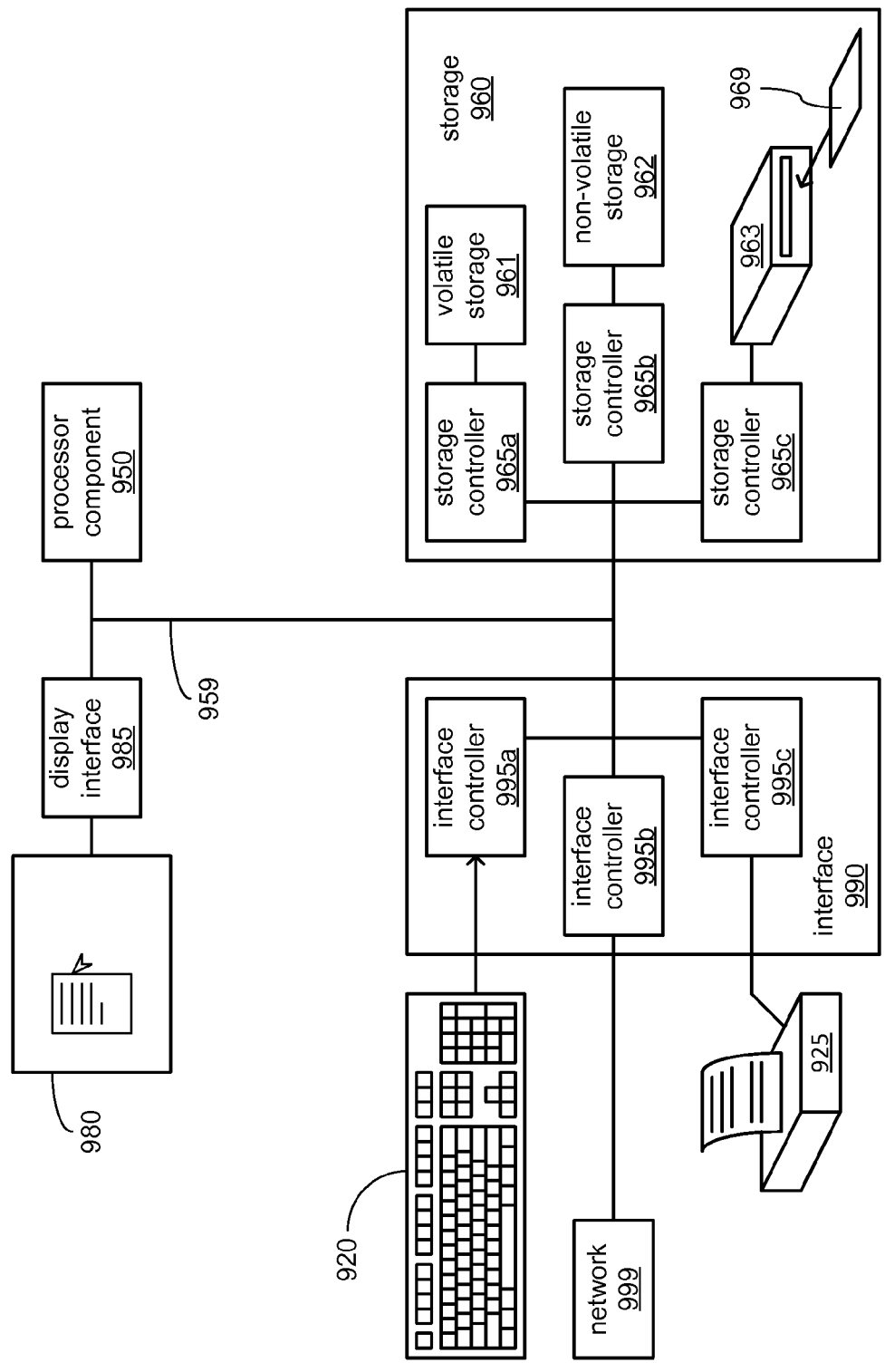
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to secure a computing device includes a processor component comprising an interrupt descriptor table (IDT) register to store an indication of size of an IDT, the IDT comprising at least one pointer to at least one interrupt service routine (ISR) of a set of ISRs; a monitoring component to retrieve the indication of size from the IDT register and to compare the indication of size to a size of a guard IDT of a guard routine in response to modification of the IDT register to determine whether the guard routine is to inspect the IDT and the set of ISRs based on the comparison; and a cache component to overwrite the IDT with a cached IDT and to overwrite the set of ISRs with a cached set of ISRs based on the determination and prior to the inspection to prevent the guard routine from detecting a modification made to at least one of the IDT and the set of ISRs by an anti-malware routine, the cache component to copy the IDT to generate the cached IDT and to copy the set of ISRs to generate the cached set of ISRs prior to the modification by the anti-malware routine.

In Example 2, which includes the subject matter of Example 1, the processor component may include a monitoring unit to monitor the IDT register for an indication of modification of the IDT register, the monitoring component to retrieve the indication of size from the IDT register in response to receiving an indication of modification of the IDT register from the monitoring unit.

In Example 3, which includes the subject matter of any of Examples 1-2, the processor component may include a security feature; and the modification by the anti-malware routine may include an additional ISR added to the set of ISRs by the anti-malware routine to enable use of the security feature and an additional entry added to the IDT by the anti-malware routine to add a pointer to the additional ISR to the IDT.

In Example 4, which includes the subject matter of any of Examples 1-3, the security feature may include circuitry to enhance performance of at least one of encrypting data, decrypting data, generating a security credential, verifying a security credential or generating a hash In Example 5, which includes the subject matter of any of Examples 1-4, the modification by the anti-malware routine may include a modification to an ISR of the set of ISRs, the ISR may handle an interrupt associated with a hardware component accessible to the processor component, the modification to the ISR may cause a flow of execution by the processor component to jump from the ISR to the anti-malware routine to enable the anti-malware routine to analyze a call to the ISR in the flow of execution to determine whether the call is to perform a malicious operation, and the anti-malware routine may prevent execution of the ISR by the processor component based on the determination of whether the call is to perform a malicious operation In Example 6, which includes the subject matter of any of Examples 1-5, the apparatus may include the hardware component, and the hardware component may include at least one of a display, a manually operable control or an interface to a network.

In Example 7, which includes the subject matter of any of Examples 1-6, the apparatus may include an interface coupling the processor component to a network and a security feature implemented with circuitry accessible to the processor component to secure an exchange of data between the processor component and a remote device coupled to the network; and the modification by the anti-malware routine may include an additional ISR added to the set of ISRs by the anti-malware routine to enable use of the security feature and an additional entry added to the IDT by the anti-malware routine to add a pointer to the additional ISR to the IDT to enable a call to the additional ISR.

In Example 8, which includes the subject matter of any of Examples 1-7, the apparatus may include at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between the interface and a display to prevent interception of the data between the interface and the display by malware executed by the processor component In Example 9, which includes the subject matter of any of Examples 1-8, the apparatus may include a change component to modify the IDT and the set of ISRs to reinstate the modification by the anti-malware routine based on another determination that the inspection by the guard routine is concluded, the monitoring component may retrieve another indication of size from the IDT register and to compare the other indication of size to a size of the IDT prior to the modification by the anti-malware routine to make the other determination, and the cache component may copy the IDT to again generate the cached IDT and to copy the set of ISRs to again generate the cached set of ISRs based on the other determination.

In Example 10, which includes the subject matter of any of Examples 1-9, the apparatus may include the anti-malware routine; and the anti-malware routine may include the monitoring component, the cache component, and a change component to make the modification to the at least one of the IDT or the set of ISRs following the generation of the cached IDT and the cached set of ISRs by the cache routine.

In Example 11, which includes the subject matter of any of Examples 1-10, the apparatus may include an operating system executed by the processor component; and the operating system may include at least one kernel component that comprises the set of ISRs and at least one kernel data structure that comprises the IDT.

In Example 12, which includes the subject matter of any of Examples 1-11, the apparatus may include the guard routine executed by the processor component and associated with the guard IDT, and the guard IDT may include at least one pointer to a guard ISR of a set of guard ISRs.

In Example 13, an apparatus to secure a computing device includes a processor component comprising an interrupt descriptor table (IDT) register to store an indication of size of an IDT, the IDT comprising at least one pointer to at least one interrupt service routine (ISR) of a set of ISRs; a cache component to store a copy of the IDT as a cached IDT in a storage accessible to the processor component and to store a copy of the set of ISRs as a cached set of ISRs in the storage based on a determination that an inspection of the IDT and the set of ISRs by a guard routine is concluded and that a pointer value within the IDT register no longer points to a guard IDT associated with the guard routine; a change component to modify at least one of the IDT or the set of ISRs to enable security against malware based on the determination; and a monitoring component to retrieve the indication of size from the IDT register and to compare the indication of size to a size of the IDT prior to the modification by the change component to make the determination based on the comparison.

In Example 14, which includes the subject matter of Example 13, the apparatus may include the processor component may include a monitoring unit to monitor the IDT register for an indication of modification of the IDT register, and the monitoring component may retrieve the indication of size from the IDT register in response to receiving an indication of modification of the IDT register from the monitoring unit.

In Example 15, which includes the subject matter of any of Examples 13-14, the processor component may include a security feature, and the modification by the anti-malware routine may include an additional ISR added to the set of ISRs by the anti-malware routine to enable use of the security feature and an additional entry added to the IDT by the anti-malware routine to add a pointer to the additional ISR to the IDT.

In Example 16, which includes the subject matter of any of Examples 13-15, the security feature may include circuitry to enhance performance of at least one of encrypting data, decrypting data, generating a security credential, verifying a security credential or generating a hash.

In Example 17, which includes the subject matter of any of Examples 13-16, the modification by the anti-malware routine may include a modification to an ISR of the set of ISRs, the ISR may handle an interrupt associated with a hardware component accessible to the processor component, the modification to the ISR may cause a flow of execution by the processor component to jump from the ISR to the anti-malware routine to enable the anti-malware routine to analyze a call to the ISR in the flow of execution to determine whether the call is to perform a malicious operation, and the anti-malware routine may prevent execution of the ISR by the processor component based on the determination of whether the call is to perform a malicious operation.

In Example 18, which includes the subject matter of any of Examples 13-17, the apparatus may include the hardware component, and the hardware component may include at least one of a display, a manually operable control or an interface to a network.

In Example 19, which includes the subject matter of any of Examples 13-18, the apparatus may include an interface coupling the processor component to a network and a security feature implemented with circuitry accessible to the processor component to secure an exchange of data between the processor component and a remote device coupled to the network; and the modification by the anti-malware routine may include an additional ISR added to the set of ISRs by the anti-malware routine to enable use of the security feature and an additional entry added to the IDT by the anti-malware routine to add a pointer to the additional ISR to the IDT to enable a call to the additional ISR.

In Example 20, which includes the subject matter of any of Examples 13-19, the security feature may include at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between the interface and a display to prevent interception of the data between the interface and the display by malware executed by the processor component.

In Example 21, which includes the subject matter of any of Examples 13-20, the apparatus may include a monitoring component to retrieve another indication of size from the IDT register and to compare the other indication of size to a size of the guard IDT in response to another modification of the IDT register and to make another determination of whether the guard routine is to perform another inspection of the IDT and of the set of ISRs; and the cache component to overwrite the IDT with the cached IDT and to overwrite the set of ISRs with the cached set of ISRs based on the other determination to prevent the guard routine from detecting the modification by the change component.

In Example 22, which includes the subject matter of any of Examples 13-21, the apparatus may include the anti-malware routine; and the anti-malware routine may include the cache component, the change component and the monitoring component.

In Example 23, which includes the subject matter of any of Examples 13-22, the apparatus may include an operating system executed by the processor component; and the operating system may include at least one kernel component that comprises the set of ISRs and at least one kernel data structure that comprises the IDT.

In Example 24, which includes the subject matter of any of Examples 13-23, the guard routine may be executed by the processor component and the guard IDT comprising at least one pointer to a guard ISR of a set of guard ISRs.

In Example 25, a computing-implemented method for securing a computing device includes retrieving an indication of size of an interrupt descriptor table (IDT) from an IDT register of a processor component in response to modification of the IDT register, the IDT comprising at least one pointer to at least one interrupt service routine (ISR) of a set of ISRs; comparing the indication of size to a size of a guard IDT of a guard routine to determine whether the guard routine is to inspect the IDT and the set of ISRs based on the comparison; and overwriting the IDT and the set of ISRs with a cached IDT and a cached set of ISRs, respectively, based on the determination and prior to the inspection to prevent the guard routine from detecting a modification made to at least one of the IDT and the set of ISRs by an anti-malware routine, the cached IDT and the cached set of ISRs copied from the IDT and the set of ISRs, respectively, prior to the modification by the anti-malware routine.

In Example 26, which includes the subject matter of Example 25, the method may include receiving an indication from a monitoring unit of the processor component of modification of the IDT register.

In Example 27, which includes the subject matter of any of Examples 25-26, the method may include comparing the indication of size to each of multiple sizes of the guard IDT, and each size of the multiple size may correspond to a different version of the guard IDT.

In Example 28, which includes the subject matter of any of Examples 25-27, the method may include copying the IDT and the set of ISRs to generate the cached IDT and the cached set of ISRs, respectively, prior to the modification by the anti-malware routine; storing the cached IDT and the cached set of ISRs within a first set of storage pages of a storage accessible the processor component, the first set of storage pages differing from a second set of storage pages of the storage in which the IDT and the set of ISRs are stored; detecting an attempt by a kernel component of an operating system executed by the processor component to access the second set of storage pages modify the IDT and the set of ISRs; and providing the kernel component access to the first set of storage pages to allow the kernel component to modify the cached IDT and the cached set of ISRs in the manner in which the kernel component attempted to modify the IDT and the set of ISRs, respectively.

In Example 29, which includes the subject matter of any of Examples 25-28, the method may include retrieving another indication of size from the IDT register in response to another modification of the IDT register; comparing the other indication of size to a size of the IDT prior to the modification by the anti-malware routine to make another determination that the inspection by the guard routine is concluded; copying the IDT and the set of ISRs to again generate the cached IDT and the cached set of ISRs, respectively, based on the other determination; and modifying the IDT and the set of ISRs to reinstate the modification by the anti-malware routine based on the other determination.

In Example 30, which includes the subject matter of any of Examples 25-29, the method may include making the modification to the at least one of the IDT and the set of ISRs, and the modification may include executable instructions added to an ISR of the set of ISRs to cause a flow of execution by the processor component to jump from executable instructions of the ISR to executable instructions of the anti-malware routine.

In Example 31, which includes the subject matter of any of Examples 25-30, the ISR may handle an interrupt associated with a hardware component accessible to the processor component; and the method may include analyzing an aspect of the flow of execution in response to the jump to determine whether the flow of execution is to perform a malicious operation and allowing the flow of execution to return to executing the executable instructions of the ISR based on the determination of whether the flow of execution is to perform a malicious operation.

In Example 32, which includes the subject matter of any of Examples 25-31, the hardware component may include at least one of a display, a manually operable control or an interface to a network.

In Example 33, which includes the subject matter of any of Examples 25-32, the method may include making the modification to the at least one of the IDT and the set of ISRs; and the modification may include an additional ISR added to the set of ISRs by the anti-malware routine to enable use of a security feature of the processor component and an additional entry added to the IDT by the anti-malware routine to add a pointer to the additional ISR to the IDT to enable a call to the additional ISR.

In Example 34, which includes the subject matter of any of Examples 25-33, the security feature may include circuitry to enhance performance of at least one of encrypting data, decrypting data, generating a security credential, verifying a security credential or generating a hash.

In Example 35, which includes the subject matter of any of Examples 25-34, the security feature may be implemented with circuitry accessible to the processor component to secure an exchange of data between the processor component and a remote device coupled to the network; and the security feature may include at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between the interface and a display to prevent interception of the data between the interface and the display by malware executed by the processor component.

In Example 36, a computing-implemented method for securing a computing device includes retrieving an indication of size of an interrupt descriptor table (IDT) from an IDT register of a processor component in response to modification of the IDT register, the IDT comprising at least one pointer to at least one interrupt service routine (ISR) of a set of ISRs; comparing the indication of size to a size of the IDT prior to a modification of at least one of the IDT or the set of ISRs by an anti-malware routine to determine whether an inspection of the IDT and the set of ISRs by a guard routine is concluded and that a pointer value within the IDT register no longer points to a guard IDT associated with the guard routine based on the comparison; and storing copies of the IDT and the set of ISRs as a cached IDT and a cached set of ISRs, respectively, in a storage accessible to the processor component based on the determination.

In Example 37, which includes the subject matter of Example 36, the method may include receiving an indication from a monitoring unit of the processor component of modification of the IDT register.

In Example 38, which includes the subject matter of any of Examples 36-37, the method may include storing the cached IDT and the cached set of ISRs within a first set of storage pages of the storage accessible the processor component, the first set of storage pages differing from a second set of storage pages of the storage in which the IDT and the set of ISRs are stored; detecting an attempt by a kernel component of an operating system executed by the processor component to access the second set of storage pages modify the IDT and the set of ISRs; and providing the kernel component access to the first set of storage pages to allow the kernel component to modify the cached IDT and the cached set of ISRs in the manner in which the kernel component attempted to modify the IDT and the set of ISRs, respectively.

In Example 39, which includes the subject matter of any of Examples 36-38, the method may include retrieving another indication of size from the IDT register in response to another modification of the IDT register; comparing the other indication of size to a size of the guard IDT to make another determination of whether the guard routine is to again inspect the IDT and the set of ISRs; and overwriting the IDT and the set of ISRs with the cached IDT and the cached set of ISRs, respectively, based on the other determination and prior to the other inspection to prevent the guard routine from detecting the modification made by the anti-malware routine.

In Example 40, which includes the subject matter of any of Examples 36-39, the method may include comparing the indication of size to each of multiple sizes of the guard IDT, each size of the multiple size corresponding to a different version of the guard IDT.

In Example 41, which includes the subject matter of any of Examples 36-40, the method may include making the modification to the at least one of the IDT and the set of ISRs, and the modification may include executable instructions added to an ISR of the set of ISRs to cause a flow of execution by the processor component to jump from executable instructions of the ISR to executable instructions of the anti-malware routine.

In Example 42, which includes the subject matter of any of Examples 36-41, the ISR may handle an interrupt associated with a hardware component accessible to the processor component; and the method may include analyzing an aspect of the flow of execution in response to the jump to determine whether the flow of execution is to perform a malicious operation and allowing the flow of execution to return to executing the executable instructions of the ISR based on the determination of whether the flow of execution is to perform a malicious operation.

In Example 43, which includes the subject matter of any of Examples 36-42, the hardware component may include at least one of a display, a manually operable control or an interface to a network.

In Example 44, which includes the subject matter of any of Examples 36-43, the method may include making the modification to the at least one of the IDT and the set of ISRs; and the modification may include an additional ISR added to the set of ISRs by the anti-malware routine to enable use of a security feature of the processor component and an additional entry added to the IDT by the anti-malware routine to add a pointer to the additional ISR to the IDT to enable a call to the additional ISR.

In Example 45, which includes the subject matter of any of Examples 36-44, the security feature may include circuitry to enhance performance of at least one of encrypting data, decrypting data, generating a security credential, verifying a security credential or generating a hash.

In Example 46, which includes the subject matter of any of Examples 36-45, the security feature may be implemented with circuitry accessible to the processor component to secure an exchange of data between the processor component and a remote device coupled to the network; and the security feature comprising at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between the interface and a display to prevent interception of the data between the interface and the display by malware executed by the processor component.

In Example 47, at least one machine-readable storage medium includes instructions that when executed by a computing device, cause the computing device to retrieve an indication of size of an interrupt descriptor table (IDT) from an IDT register of a processor component of the computing device in response to modification of the IDT register, the IDT comprising at least one pointer to at least one interrupt service routine (ISR) of a set of ISRs; compare the indication of size to a size of a guard IDT of a guard routine to determine whether the guard routine is to inspect the IDT and the set of ISRs based on the comparison; and overwrite the IDT and the set of ISRs with a cached IDT and a cached set of ISRs, respectively, based on the determination and prior to the inspection to prevent the guard routine from detecting a modification made to at least one of the IDT and the set of ISRs by an anti-malware routine, the cached IDT and the cached set of ISRs copied from the IDT and the set of ISRs, respectively, prior to the modification by the anti-malware routine.

In Example 48, which includes the subject matter of Example 47, the computing device may be caused to compare the indication of size to each of multiple sizes of the guard IDT, each size of the multiple size corresponding to a different version of the guard IDT.

In Example 49, which includes the subject matter of any of Examples 47-48, the computing device may be caused to copy the IDT and the set of ISRs to generate the cached IDT and the cached set of ISRs, respectively, prior to the modification by the anti-malware routine; store the cached IDT and the cached set of ISRs within a first set of storage pages of a storage of the computing device accessible the processor component, the first set of storage pages differing from a second set of storage pages of the storage in which the IDT and the set of ISRs are stored; detect an attempt by a kernel component of an operating system executed by the processor component to access the second set of storage pages modify the IDT and the set of ISRs; and provide the kernel component access to the first set of storage pages to allow the kernel component to modify the cached IDT and the cached set of ISRs in the manner in which the kernel component attempted to modify the IDT and the set of ISRs, respectively.

In Example 50, which includes the subject matter of any of Examples 47-49, the computing device may be caused to retrieve another indication of size from the IDT register in response to another modification of the IDT register; compare the other indication of size to a size of the IDT prior to the modification by the anti-malware routine to make another determination that the inspection by the guard routine is concluded; copy the IDT and the set of ISRs to again generate the cached IDT and the cached set of ISRs, respectively, based on the other determination; and modify the IDT and the set of ISRs to reinstate the modification by the anti-malware routine based on the other determination.

In Example 51, which includes the subject matter of any of Examples 47-50, the computing device may be caused to make the modification to the at least one of the IDT and the set of ISRs, and the modification may include executable instructions added to an ISR of the set of ISRs to cause a flow of execution by the processor component to jump from executable instructions of the ISR to executable instructions of the anti-malware routine.

In Example 52, which includes the subject matter of any of Examples 47-51, the ISR may handle an interrupt associated with a hardware component accessible to the processor component, and the computing device may be caused to analyze an aspect of the flow of execution in response to the jump to determine whether the flow of execution is to perform a malicious operation and allow the flow of execution to return to executing the executable instructions of the ISR based on the determination of whether the flow of execution is to perform a malicious operation.

In Example 53, which includes the subject matter of any of Examples 47-52, the hardware component may include at least one of a display, a manually operable control or an interface to a network.

In Example 54, which includes the subject matter of any of Examples 47-53, the computing device may be caused to make the modification to the at least one of the IDT and the set of ISRs; and the modification may include an additional ISR added to the set of ISRs by the anti-malware routine to enable use of a security feature of the processor component and an additional entry added to the IDT by the anti-malware routine to add a pointer to the additional ISR to the IDT to enable a call to the additional ISR.

In Example 55, which includes the subject matter of any of Examples 47-54, the security feature may include circuitry to enhance performance of at least one of encrypting data, decrypting data, generating a security credential, verifying a security credential or generating a hash.

In Example 56, which includes the subject matter of any of Examples 47-55, the security feature may be implemented with circuitry accessible to the processor component to secure an exchange of data between the processor component and a remote device coupled to the network; and the security feature may include at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between the interface and a display to prevent interception of the data between the interface and the display by malware executed by the processor component.

In Example 57, at least one machine-readable storage medium includes instructions that when executed by a computing device, cause the computing device to retrieve an indication of size of an interrupt descriptor table (IDT) from an IDT register of a processor component of the computing device in response to modification of the IDT register, the IDT comprising at least one pointer to at least one interrupt service routine (ISR) of a set of ISRs; compare the indication of size to a size of the IDT prior to a modification of at least one of the IDT or the set of ISRs by an anti-malware routine to determine whether an inspection of the IDT and the set of ISRs by a guard routine is concluded and that a pointer value within the IDT register no longer points to a guard IDT associated with the guard routine based on the comparison; and store copies of the IDT and the set of ISRs as a cached IDT and a cached set of ISRs, respectively, based on the determination in a storage of the computing device that is accessible to the processor component.

In Example 58, which includes the subject matter of Example 57, the computing device may be caused to store the cached IDT and the cached set of ISRs within a first set of storage pages of the storage accessible the processor component, the first set of storage pages differing from a second set of storage pages of the storage in which the IDT and the set of ISRs are stored; detecting an attempt by a kernel component of an operating system executed by the processor component to access the second set of storage pages modify the IDT and the set of ISRs; and providing the kernel component access to the first set of storage pages to allow the kernel component to modify the cached IDT and the cached set of ISRs in the manner in which the kernel component attempted to modify the IDT and the set of ISRs, respectively.

In Example 59, which includes the subject matter of any of Examples 57-58, the computing device may be caused to retrieve another indication of size from the IDT register in response to another modification of the IDT register; compare the other indication of size to a size of the guard IDT to make another determination of whether the guard routine is to again inspect the IDT and the set of ISRs; and overwrite the IDT and the set of ISRs with the cached IDT and the cached set of ISRs, respectively, based on the other determination and prior to the other inspection to prevent the guard routine from detecting the modification made by the anti-malware routine.

In Example 60, which includes the subject matter of any of Examples 57-59, the computing device may be caused to compare the indication of size to each of multiple sizes of the guard IDT, each size of the multiple size corresponding to a different version of the guard IDT.

In Example 61, which includes the subject matter of any of Examples 57-60, the computing device may be caused to make the modification to the at least one of the IDT and the set of ISRs, and the modification may include executable instructions added to an ISR of the set of ISRs to cause a flow of execution by the processor component to jump from executable instructions of the ISR to executable instructions of the anti-malware routine.

In Example 62, which includes the subject matter of any of Examples 57-61, the ISR may handle an interrupt associated with a hardware component accessible to the processor component; and the computing device may be caused to analyze an aspect of the flow of execution in response to the jump to determine whether the flow of execution is to perform a malicious operation, and allow the flow of execution to return to executing the executable instructions of the ISR based on the determination of whether the flow of execution is to perform a malicious operation.

In Example 63, which includes the subject matter of any of Examples 57-62, the hardware component may include at least one of a display, a manually operable control or an interface to a network.

In Example 64, which includes the subject matter of any of Examples 57-63, the computing device may be caused to make the modification to the at least one of the IDT and the set of ISRs; and the modification may include an additional ISR added to the set of ISRs by the anti-malware routine to enable use of a security feature of the processor component and an additional entry added to the IDT by the anti-malware routine to add a pointer to the additional ISR to the IDT to enable a call to the additional ISR.

In Example 65, which includes the subject matter of any of Examples 57-64, the security feature may include circuitry to enhance performance of at least one of encrypting data, decrypting data, generating a security credential, verifying a security credential or generating a hash.

In Example 66, which includes the subject matter of any of Examples 57-65, the security feature implemented with circuitry accessible to the processor component to secure an exchange of data between the processor component and a remote device coupled to the network; and the security feature may include at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between the interface and a display to prevent interception of the data between the interface and the display by malware executed by the processor component.

In Example 67, at least one machine-readable storage medium may include instructions that when executed by a computing device, cause the computing device to perform any of the above.

In Example 68, an apparatus to monitor interactions may include means for performing any of the above.

The invention claimed is:

1. An apparatus to secure a computing device comprising:
a processor component comprising an interrupt descriptor table (IDT) register to store an indication of size of an IDT, the IDT comprising at least one pointer to at least one interrupt service routine (ISR) of a set of ISRs; and
a set of instructions to be executed by processing circuitry operably coupled to the processor component, the set of instructions to cause the processing circuitry to:
retrieve the indication of size from the IDT register and to compare the indication of size to a size of a guard IDT of a guard routine in response to modification of the IDT register to determine whether the guard routine is to inspect the IDT and the set of ISRs based on the comparison; and
overwrite the IDT with a cached IDT and to overwrite the set of ISRs with a cached set of ISRs based on the determination and prior to the inspection to prevent the guard routine from detecting a modification made to at least one of the IDT and the set of ISRs by an anti-malware routine; and
copy the IDT to generate the cached IDT and to copy the set of ISRs to generate the cached set of ISRs prior to the modification by the anti-malware routine.

2. The apparatus of claim 1, the processor component comprising a monitoring unit to monitor the IDT register for an indication of modification of the IDT register, the set of instructions to cause the processing circuitry to retrieve the indication of size from the IDT register in response to receiving an indication of modification of the IDT register from the monitoring unit.

3. The apparatus of claim 1, the processor component comprising a security feature, and the modification by the anti-malware routine comprising:
an additional ISR added to the set of ISRs by the anti-malware routine to enable use of the security feature, the security feature comprising circuitry to enhance performance of at least one of encrypting data, decrypting data, generating a security credential, verifying a security credential or generating a hash; and
an additional entry added to the IDT by the anti-malware routine to add a pointer to the additional ISR to the IDT.

4. The apparatus of claim 1, the modification by the anti-malware routine comprising a modification to an ISR of the set of ISRs, the ISR to handle an interrupt associated with a hardware component accessible to the processor component, the modification to the ISR to cause a flow of execution by the processor component to jump from the ISR to the anti-malware routine to enable the anti-malware routine to analyze a call to the ISR in the flow of execution to determine whether the call is to perform a malicious operation, and the anti-malware routine to prevent execution of the ISR by the processor component based on the determination of whether the call is to perform a malicious operation.

5. The apparatus of claim 4, comprising the hardware component, and the hardware component comprising at least one of a display, a manually operable control or an interface to a network.

6. The apparatus of claim 1, comprising:
an interface coupling the processor component to a network; and
a security feature implemented with circuitry accessible to the processor component to secure an exchange of data between the processor component and a remote device coupled to the network, the modification by the anti-malware routine comprising:
an additional ISR added to the set of ISRs by the anti-malware routine to enable use of the security feature; and
an additional entry added to the IDT by the anti-malware routine to add a pointer to the additional ISR to the IDT to enable a call to the additional ISR.

7. The apparatus of claim 1, the set of instruction to cause the processing component to:
modify the IDT and the set of ISRs to reinstate the modification by the anti-malware routine based on another determination that the inspection by the guard routine is concluded;

retrieve another indication of size from the IDT register and to compare the other indication of size to a size of the IDT prior to the modification by the anti-malware routine to make the other determination; and copy the IDT to again generate the cached IDT and to copy the set of ISRs to again generate the cached set of ISRs based on the other determination.

8. A computer-implemented method for securing a computing device comprising:

retrieving an indication of size of an interrupt descriptor table (IDT) from an IDT register of a processor component in response to modification of the IDT register, the IDT comprising at least one pointer to at least one interrupt service routine (ISR) of a set of ISRs;

analyzing the indication of size to determine whether a guard routine is to inspect the IDT and the set of ISRs based on the analysis; and overwriting the IDT and the set of ISRs with a cached IDT and a cached set of ISRs, respectively, based on the determination and prior to the inspection to prevent the guard routine from detecting a modification made to at least one of the IDT and the set of ISRs by an anti-malware routine, the cached IDT and the cached set of ISRs copied from the IDT and the set of ISRs, respectively, prior to the modification by the anti-malware routine.

9. The computer-implemented method of claim 8, the method comprising:

receiving an indication from a monitoring unit of the processor component of modification of the IDT register; and comparing the indication of size to each of multiple sizes of a guard IDT of the guard routine, each size of the multiple size corresponding to a different version of the guard IDT.

10. The computer-implemented method of claim 8, the method comprising:

copying the IDT and the set of ISRs to generate the cached IDT and the cached set of ISRs, respectively, prior to the modification by the anti-malware routine;

storing the cached IDT and the cached set of ISRs within a first set of storage pages of a storage accessible the processor component, the first set of storage pages differing from a second set of storage pages of the storage in which the IDT and the set of ISRs are stored;

detecting an attempt by a kernel component of an operating system executed by the processor component to access the second set of storage pages modify the IDT and the set of ISRs; and providing the kernel component access to the first set of storage pages to allow the kernel component to modify the cached IDT and the cached set of ISRs in the manner in which the kernel component attempted to modify the IDT and the set of ISRs, respectively.

11. The computer-implemented method of claim 8, the method comprising:

retrieving another indication of size from the IDT register in response to another modification of the IDT register;

comparing the other indication of size to a size of the IDT prior to the modification by the anti-malware routine to make another determination that the inspection by the guard routine is concluded;

copying the IDT and the set of ISRs to again generate the cached IDT and the cached set of ISRs, respectively, based on the other determination; and modifying the IDT and the set of ISRs to reinstate the modification by the anti-malware routine based on the other determination.

12. The computer-implemented method of claim 8, the method comprising:

making the modification to the at least one of the IDT and the set of ISRs, the modification comprising executable instructions added to an ISR of the set of ISRs to cause a flow of execution by the processor component to jump from executable instructions of the ISR to executable instructions of the anti-malware routine and the ISR to handle an interrupt associated with a hardware component accessible to the processor component;

analyzing an aspect of the flow of execution in response to the jump to determine whether the flow of execution is to perform a malicious operation; and allowing the flow of execution to return to executing the executable instructions of the ISR based on the determination of whether the flow of execution is to perform a malicious operation.

13. The computer-implemented method of claim 8, the method comprising making the modification to the at least one of the IDT and the set of ISRs, the modification comprising:

an additional ISR added to the set of ISRs by the anti-malware routine to enable use of a security feature of the processor component; and an additional entry added to the IDT by the anti-malware routine to add a pointer to the additional ISR to the IDT to enable a call to the additional ISR.

14. At least one non-transitory machine-readable storage medium comprising instructions that when executed by a computing device, cause the computing device to:

retrieve an indication of size of an interrupt descriptor table (IDT) from an IDT register of a processor component of the computing device in response to modification of the IDT register, the IDT comprising at least one pointer to at least one interrupt service routine (ISR) of a set of ISRs;

compare the indication of size to a size of a guard IDT of a guard routine to determine whether the guard routine is to inspect the IDT and the set of ISRs based on the comparison; and overwrite the IDT and the set of ISRs with a cached IDT and a cached set of ISRs, respectively, based on the determination and prior to the inspection to prevent the guard routine from detecting a modification made to at least one of the IDT and the set of ISRs by an anti-malware routine, the cached IDT and the cached set of ISRs copied from the IDT and the set of ISRs, respectively, prior to the modification by the anti-malware routine.

15. The at least one non-transitory machine-readable storage medium of claim 14, the computing device caused to:

copy the IDT and the set of ISRs to generate the cached IDT and the cached set of ISRs, respectively, prior to the modification by the anti-malware routine;

store the cached IDT and the cached set of ISRs within a first set of storage pages of a storage of the computing device accessible the processor component, the first set of storage pages differing from a second set of storage pages of the storage in which the IDT and the set of ISRs are stored;

detect an attempt by a kernel component of an operating system executed by the processor component to access the second set of storage pages modify the IDT and the set of ISRs; and provide the kernel component access to the first set of storage pages to allow the kernel component to modify the cached IDT and the cached set of ISRs in the manner in which the kernel component attempted to modify the IDT and the set of ISRs, respectively.

16. The at least one non-transitory machine-readable storage medium of claim 14, the computing device caused to:

retrieve another indication of size from the IDT register in response to another modification of the IDT register;

compare the other indication of size to a size of the IDT prior to the modification by the anti-malware routine to make another determination that the inspection by the guard routine is concluded;

copy the IDT and the set of ISRs to again generate the cached IDT and the cached set of ISRs, respectively, based on the other determination; and modify the IDT and the set of ISRs to reinstate the modification by the anti-malware routine based on the other determination.

17. The at least one non-transitory machine-readable storage medium of claim 14, the computing device caused to make the modification to the at least one of the IDT and the set of ISRs, the modification comprising executable instructions added to an ISR of the set of ISRs to cause a flow of execution by the processor component to jump from executable instructions of the ISR to executable instructions of the anti-malware routine.

18. The at least one non-transitory machine-readable storage medium of claim 17, the ISR to handle an interrupt associated with a hardware component accessible to the processor component, the computing device caused to:

analyze an aspect of the flow of execution in response to the jump to determine whether the flow of execution is to perform a malicious operation; and allow the flow of execution to return to executing the executable instructions of the ISR based on the determination of whether the flow of execution is to perform a malicious operation.

19. The at least one non-transitory machine-readable storage medium of claim 14, the computing device caused to make the modification to the at least one of the IDT and the set of ISRs, the modification comprising:

an additional ISR added to the set of ISRs by the anti-malware routine to enable use of a security feature of the processor component; and an additional entry added to the IDT by the anti-malware routine to add a pointer to the additional ISR to the IDT to enable a call to the additional ISR.

20. The at least one non-transitory machine-readable storage medium of claim 19, the security feature implemented with circuitry accessible to the processor component to secure an exchange of data between the processor component and a remote device coupled to a network, the security feature comprising at least one of an encryption engine to encrypt the data prior to transmission of the data to the remote device, an encryption engine to encrypt the data prior to storage of the data within a storage accessible to the processor component to prevent reading of the data by malware executed by the processor component, or a secure pathway between an interface and a display to prevent interception of the data between the interface and the display by malware executed by the processor component.

21. At least one non-transitory machine-readable storage medium comprising instructions that when executed by a computing device, cause the computing device to:

retrieve an indication of size of an interrupt descriptor table (IDT) from an IDT register of a processor component of the computing device in response to modification of the IDT register, the IDT comprising at least one pointer to at least one interrupt service routine (ISR) of a set of ISRs;

compare the indication of size to a size of the IDT prior to a modification of at least one of the IDT or the set of ISRs by an anti-malware routine to determine whether an inspection of the IDT and the set of ISRs by a guard routine is concluded and that a pointer value within the IDT register no longer points to a guard IDT associated with the guard routine based on the comparison;

store copies of the IDT and the set of ISRs as a cached IDT and a cached set of ISRs, respectively, based on the determination in a storage of the computing device that is accessible to the processor component;

retrieve another indication of size from the IDT register in response to another modification of the IDT register;

compare the other indication of size to a size of the guard IDT to make another determination of whether the guard routine is to again inspect the IDT and the set of ISRs; and overwrite the IDT and the set of ISRs with the cached IDT and the cached set of ISRs, respectively, based on the other determination and prior to the other inspection to prevent the guard routine from detecting the modification made by the anti-malware routine.

22. The at least one non-transitory machine-readable storage medium of claim 21, the computing device caused to:

store the cached IDT and the cached set of ISRs within a first set of storage pages of the storage accessible the processor component, the first set of storage pages differing from a second set of storage pages of the storage in which the IDT and the set of ISRs are stored;

detecting an attempt by a kernel component of an operating system executed by the processor component to access the second set of storage pages modify the IDT and the set of ISRs; and providing the kernel component access to the first set of storage pages to allow the kernel component to modify the cached IDT and the cached set of ISRs in the manner in which the kernel component attempted to modify the IDT and the set of ISRs, respectively.

23. The at least one non-transitory machine-readable storage medium of claim 21, the computing device caused to make the modification to the at least one of the IDT and the set of ISRs, the modification comprising:

an additional ISR added to the set of ISRs by the anti-malware routine to enable use of a security feature of the processor component; and an additional entry added to the IDT by the anti-malware routine to add a pointer to the additional ISR to the IDT to enable a call to the additional ISR.

24. The at least one non-transitory machine-readable storage medium of claim 23, the security feature comprising circuitry to enhance performance of at least one of encrypting data, decrypting data, generating a security credential, verifying a security credential or generating a hash.

* * * * *